US011520803B1

(12) United States Patent
Garapati et al.

(10) Patent No.: US 11,520,803 B1
(45) Date of Patent: Dec. 6, 2022

(54) BIG-DATA VIEW INTEGRATION PLATFORM

(71) Applicant: STATE FARM MUTUAL AUTOMOBILE INSURANCE COMPANY, Bloomington, IL (US)

(72) Inventors: Sunitha Garapati, Normal, IL (US); Ryan M. Kroutil, Sugar Hill, GA (US); Brent Giosta, Bloomington, IL (US); Venu Madhav Valluri, Johns Creek, GA (US); Jennifer Pearsall, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/417,943

(22) Filed: May 21, 2019

Related U.S. Application Data

(60) Provisional application No. 62/731,449, filed on Sep. 14, 2018.

(51) Int. Cl.
*G06F 3/048* (2013.01)
*G06F 16/26* (2019.01)
(Continued)

(52) U.S. Cl.
CPC ............ *G06F 16/26* (2019.01); *G06F 3/0482* (2013.01); *G06F 16/2465* (2019.01);
(Continued)

(58) Field of Classification Search
CPC ..... H04L 41/22; G06F 16/258; G06F 16/248; G06F 16/25; G06F 16/24568;
(Continued)

(56) References Cited

U.S. PATENT DOCUMENTS 6,351,761 B1   2/2002 Cantone et al.
9,426,833 B2   8/2016 Mufti et al.
(Continued)

OTHER PUBLICATIONS

Non Finai Office Action dated Aug. 24, 2020 for U.S. Appl. No. 16/417,919; "Big-Data View Integration Platform", Garapati, 15 pages.

*Primary Examiner* — Aleksey Olshannikov
(74) *Attorney, Agent, or Firm* — Lee & Hayes, P.C.

(57) ABSTRACT

A big-data view integration platform generates integration guided user interfaces (GUIs). A first edge node ingests push-based and pull-based data from a plurality of platform services, which include legacy and non-legacy services having incompatible communication protocols. An event-based queue receives from the first edge node a plurality of queue events as indirect push-based data. A second set of queue events includes direct push-based data as received directly from a non-legacy platform service. A conformity component integrates the push-based data, the pull-based data, and the plurality of queue events into integration data having an enhanced integration format. A view integration component generates a plurality of data views from the integration data. A second edge node exposes the plurality of data views via an access services application programming interface (API). A new service execution component accesses the access services API to generate integration GUIs based on the data views.

20 Claims, 32 Drawing Sheets

(51) Int. Cl.
*G06F 16/2458* (2019.01)
*G06F 3/0482* (2013.01)
*G06F 16/28* (2019.01)
*G06F 16/25* (2019.01)

(52) U.S. Cl.
CPC .......... *G06F 16/254* (2019.01); *G06F 16/287* (2019.01); *G06F 2203/04803* (2013.01)

(58) Field of Classification Search
CPC .. G06F 16/182; G06F 16/273; G06F 11/0709; G06F 16/2456; G06F 11/3082; G06F 16/954; G06F 16/335; G06F 16/26; G06F 16/287; G06F 16/2465; G06F 16/254; G06F 3/0482; G06F 2203/04803
USPC .......................................................... 715/201
See application file for complete search history.

(56) References Cited

U.S. PATENT DOCUMENTS

| | | | |
|---|---|---|---|
| 9,779,173 B2 | 10/2017 | Parsons et al. | |
| 9,805,078 B2 | 10/2017 | Agarwal et al. | |
| 10,545,951 B1 | 1/2020 | Lieberman | |
| 10,775,976 B1 | 9/2020 | Abdul-Jawad et al. | |
| 2002/0188702 A1 | 12/2002 | Short, III et al. | |
| 2007/0061487 A1 | 3/2007 | Moore et al. | |
| 2008/0172391 A1 | 7/2008 | Adelman et al. | |
| 2010/0180206 A1 | 7/2010 | Silva, Jr. et al. | |
| 2011/0022471 A1 | 1/2011 | Brueck et al. | |
| 2011/0265116 A1 | 10/2011 | Stern et al. | |
| 2013/0246588 A1 | 9/2013 | Borowicz et al. | |
| 2014/0156806 A1* | 6/2014 | Karpistsenko | G06Q 50/28 709/219 |
| 2014/0279764 A1 | 9/2014 | Lahr | |
| 2014/0282796 A1 | 9/2014 | Walker et al. | |
| 2014/0325366 A1* | 10/2014 | Dunphey | G06Q 10/10 715/738 |
| 2015/0040052 A1 | 2/2015 | Noel et al. | |
| 2015/0142501 A1 | 5/2015 | Nair | |
| 2015/0146963 A1 | 5/2015 | Klein et al. | |
| 2016/0034491 A1* | 2/2016 | Chen | G06F 11/10 714/776 |
| 2016/0328775 A1 | 11/2016 | Lloyd et al. | |
| 2017/0006135 A1* | 1/2017 | Siebel | H04L 69/40 |
| 2017/0048095 A1 | 2/2017 | Sun et al. | |
| 2017/0168878 A1* | 6/2017 | Chandra | G06Q 10/103 |
| 2017/0171050 A1 | 6/2017 | Puzis et al. | |
| 2017/0192758 A1 | 7/2017 | Apte et al. | |
| 2017/0220334 A1* | 8/2017 | Hart | H04L 67/34 |
| 2017/0223128 A1 | 8/2017 | Shuvaev et al. | |
| 2017/0331923 A1 | 11/2017 | Smedberg et al. | |
| 2017/0353946 A1 | 12/2017 | Rico Alvarino et al. | |
| 2018/0159746 A1 | 6/2018 | Li et al. | |
| 2018/0239615 A1* | 8/2018 | Ravid | G06F 16/1794 |
| 2019/0155961 A1 | 5/2019 | Alonso et al. | |
| 2019/0287032 A1 | 9/2019 | Seabolt et al. | |
| 2019/0378428 A1 | 12/2019 | Nevarez et al. | |
| 2020/0012656 A1* | 1/2020 | Pugh | G06F 16/258 |
| 2020/0053280 A1 | 2/2020 | Han et al. | |
| 2021/0326336 A1 | 10/2021 | Garapati et al. | |

\* cited by examiner

Business Planning Benefits in Agency Suite of Tools

GOALS
Ability to Capture Goals in a Consistent Location

STRATEGY
Auto/Fire Gain Strategy Can Help You Document Activities Supporting Your Goals

ACTION PLANS
Ability for You to Design Action Plan

DISTRIBUTE GOALS
Ability to Distribute Goals and Action Items to Your Team

TEAM ACCESS
Ability to Empower Your Team Through Team Access and Customized Goals

SUBMIT ONLINE
Ability to Easily Submit Your Business Plan to Sales Leader

REPORTING
Integrate Customizable Weekly Reporting for each Line of Business**

ON TARGET
Compare Office Goals to Actual Production

MOBILE ACCESS
Track Office Production While Away from Office

FIG. 3

Digital Whiteboard

Digital Whiteboard Report

> Trennert, Diane
Diaz, Jazmin
Diaz, Valeria
Ganibay, Esther
Pacius, Ashlie
Trennert, Russell DIGITAL WHITEBOARD REPORT
Diane Trennert (OE0WF7) — 602

Select date range    Start Date (MM/DD/YYYY)  10/01/2017
                     End Date (MM/DD/YYYY)    10/25/2017

Update

604
| | |
|---|---|
| Outbound Call | 2 |
| Quote | 6 |
|   Auto | 2 |
|   Fire | 1 |
|   Health | 2 |
|   Life | 1 |
| Quote Follow-up Call | 1 |
| Quote Follow-up Call Email | 1 |
| Pivot | 5 |
|   Auto | 1 |
|   Bank | 1 |
|   Fire | 1 |
|   Health | 1 |
|   Life | 1 |
| Application | 5 |
|   Health | 1 |
|     Disability Income | 4 |
|   Life | 3 |
|     Universal Life | 1 |
|     Term Life | 2 |
| Appointment Set-up | 2 |
| Appointment Confirmation/File Prep | 2 |

FIG. 6A

| | | 650 |
|---|---|---|
| Internet Enabled | 1 | |
| Late Pays | 2 | |
| Referral | 2 | |
| Simple Conversation | 2 | |
| Update Customer Information | 2 | |
| great customer a | 2 | |
| Total | 39 | |

606

Sort by: Date | Customer Name | Activity | Line of Business | Status Date | Status
1-10 of 39 item | Showing: [10] 20 50 Show All   608                    [1] 2·3·4 >

| Date | Customer Name | Activity | Line of Business | Premium | Status Date | Status | Delete |
|---|---|---|---|---|---|---|---|
| 10/25/2017 | Flipper | great customer a | | | | | 🗑 Delete |
| 10/25/2017 | Flipper | Update Customer Information (1) | | | | | 🗑 Delete |
| 10/25/2017 | Flipper | Simple Conversation (1) | | | | | 🗑 Delete |
| 10/25/2017 | Flipper | Referral (1) | | | | | 🗑 Delete |
| 10/25/2017 | Flipper | Late Pays (1) | | | | | 🗑 Delete |
| 10/25/2017 | Flipper | Appointment Kept | | | | | 🗑 Delete |
| 10/25/2017 | Flipper | Appointment Confirmation/File Prep (1) | | | | | 🗑 Delete |
| 10/25/2017 | Flipper | Appointment Set-up Prep (1) | | | | | 🗑 Delete |
| 10/25/2017 | | Quote (1) | Health | | | | 🗑 Delete |
| 10/25/2017 | Flipper | Quote (1) | Auto | | | | 🗑 Delete |

1-10 of 39 item | Showing: [10] 20 50 Show All                         [1] 2·3·4 >

FIG. 6B

Business Planning    Reporting    Incentives    Settings

INCENTIVE
Create New/Update Incentive Plan

Disclaimer

*This optional compensation tool is being made available to you (the State Farm agent) if you choose to use it to assist you in your calculation of compensation for your employees. While every effort has been made to ensure the calculations and information contained in this tool are accurate errors are always a possibility. Use the adjustments page to manage the proper adjustments deemed proper by you the agent. Also, an independent contractor agent's actual results will vary and information in this tool must not be relied upon as fact. Thus, you should not rely on information in this tool as a guarantee of any compensation amounts. The information contained in this tool is not intended to modify, amend, supersede or replace terms of the State Farm Agents' agreement, schedules of payments, or amendments (collectively "Documents") thereto. It is also not intended to substitute for a complete review and understanding of those documents. Agents are independent contractors who hire their own employees. State Farm agents' employees are not employees of State Farm, and payroll decisions [for agent employees] are exclusively made by the agent. Use of these tools is at the sole discretion of the agent.*

Select Plan    [▼]

Name of Plan    [          ]

Frequency of Plan    ● Repeat Every [   ] [▼]
                         ○ 15th and Last Day of Month

Start on    [   📅]

Incentives

☐ Applications    ☐ Quotes    ☐ Other Activities

Assign Agent Team Members

☐ Alleyne, David    ☐ Kaplan, William    ☐ Jones, Jessica

[Continue]

Incentive Plan
▸ Create New/Update Incentive
  Calculate Office Incentive

| | Business Planning | Reporting | Incentives | Settings |

Sales Plan
Selection
Incentives
   Applications ···
Summary
Save &
Continue Later INCENTIVES
Applications
Incentivize by Line of Business?   902   ⦿ Yes    O No Check Line of Business
on Which to Pay
   ☑ Auto
      ☐ Total Auto
      ☑ Raw New Auto
      ☐ Added Auto
   ☐ Fire
   ☐ Life
   ☐ Health

904

Raw New Auto

Incentive earned when policy/product is    O Written    ⦿ Issued

906

Incentivize per Raw
New Auto

| Select One | ? |
| Dollar Per Count |
| Percentage Of Premium |
| Tier |

[Previous]      [Continue]

Add Entry Point [?]

1002

○ Any    ● All    ○ Advanced

1004

Criteria
[Outbound Call ▼]

Type
[Count ▼]

Amount
[10]

Criteria
[Pivot Life ▼]

Type
[Count ▼]

Amount
[5]

[+] [🗑]

Entry Point Formula
[10 Outbound Call AND 5 Pivot Life]

FIG. 10

Add Entry Point [?]

○ Any  ○ All  ● Advanced

| Criteria | Type | Amount |
|---|---|---|
| Outbound Call ▼ | Count ▼ | 10 |
| Pivot Life ▼ | Count ▼ | 5 |
| Application - Total Life ▼ | Count ▼ | 3 |

[+] [🗑]

Entry Point Formula  1104

( 10 Outbound Call AND 5 Pivot Life ) OR 3 Application - Total Life

Create Formula  1102

[ ( ] [ ) ] [ AND ] [ OR ]   [✓] [←] [🗑]

[ 10 Outbound Call ]

[ 5 Pivot Life ]

[ 3 Application - Total Life ]

| 🏠 | Business Planning | Reporting | Incentives | Settings |

Sales Team

Selection

Applications

Quotes

Other Activities

Summary

Summary ···

Save & Continue Later

1204

INCENTIVES
Summary - Sales Team

Assigned Agent Team Members

☑ Alleyne, David     ☑ Kaplan, William     ☑ Jones, Jessica

Incentives  1202

| Applications | Quotes | Other Activities |

Auto

| Raw New Auto | Incentive | Incentive Rate |
|---|---|---|
| Written | Tier 1: 1-10<br>Tier 2: 11-20<br>Tier 3: 21-<br>Retroactive | $1.00<br>$2.00<br>$3.00 |

FIG. 12

Incentive Plans
Service Team
Sales Team
Create New/Update Incentive
Calculate Office Incentive

INCENTIVES
Incentive Plans

Disclaimer

This optional compensation tool is being made available to you (the State Farm agent) if you choose to use it to assist you in your calculation of compensation for your employees. While every effort has been made to ensure the calculations and information contained in this tool are accurate errors are always a possibility. Use the adjustments page to manage the proper adjustments deemed proper by you the agent. Also, an independent contractor agent's actual results will vary and information in this tool must not be relied upon as fact. Thus, you should not rely on information in this tool as a guarantee of any compensation amounts. The information contained in this tool is not intended to modify, amend, supersede or replace terms of the State Farm Agents' agreement, schedules of payments, or amendments (collectively "Documents") thereto. It is also not intended to substitute for a complete review and understanding of those documents. *Agents are independent contractors who hire their own employees. State Farm agents' employees are not employees of State Farm, and payroll decisions [for agent employees] are exclusively made by the agent. Use of these tools is at the sole discretion of the agent.*

| Plan Name | Agent Team Members Assigned | |
|---|---|---|
| Service Team | Roe, Kelly | ✎ Edit  🗑 Delete |
| Sales Team | Guthrie, Ron | ✎ Edit  🗑 Delete |

BIG-DATA VIEW INTEGRATION PLATFORM

CROSS REFERENCE TO RELATED APPLICATIONS

This application claims the benefit of U.S. Provisional Application No. 62/731,449 (filed on Sep. 14, 2018). The entirety of the foregoing provisional application is incorporated by reference herein.

FIELD OF THE DISCLOSURE

The present disclosure generally relates to big data and cloud-based platforms, and, more particularly, to a big-data view integration platform configured to generate integration guided user interfaces (GUIs).

BACKGROUND

Typical office management software and/or platforms provide general business planning and compensation management capabilities, but fail to provide cross-platform, and cross business, solutions. Consequently, such office management software and/or platforms typically constitute waste in the form of end user manual work and or use, training, and/or dependency on multiple, disparate management software and/or platforms which leads to numerous inefficiencies. For example, end users generally require and rely on various manual processes and paper work to manage their business and office staff. Conventional management software products generally fail provide comprehensive and business-need specific solutions that help end users (e.g., office personnel, agent(s), etc.) manage their office and business effectively. For example, such office software management products are generally narrowly focused, and have limited capabilities, and, thus, require an office to utilize multiple software products which can lead to inefficiencies, including redundancies and desynchronized data. In addition, data failures and redundancy in such office management products leads to potential errors and/or poor insights into real-time statuses of a plurality of business issues. For example, end users may be forced to manually synthesize/derive the information from paper files or non-integrated office management software products to perform evaluations or analysis, e.g., such as evaluating a team member's performance.

Such disjoint and non-synchronous information creates several problems. For example, with respect to raw data, data among different and various platforms and/or management software products is not compatible, which can lead to short-sighted assessments of performance. In addition, correlation of performance with other factors (location, role, and topic) are only anecdotally measurable. Further, conventional platforms and/or management software are unable to directly evaluate information across-platforms, for example, with other, different variables contained or generated by such platforms and/or management software.

Such data issues in turn create problems for end users. For example, end user engagement, capability, and aptitude among various disparate platforms and/or management software is typically limited. For example, end users typically experience difficulties in utilizing the disparate platforms and/or management effectively and/or efficiently. In addition, in scenarios where user efficiency is to be tracked, such disparate platforms and/or management software creates problems in determining, quantitatively, whether users are utilizing correct portions of the software (e.g., via keyword searches, out-of-scope inquiries, etc.).

Other problems that arise via the use of disparate platforms and/or management software include the inability to attribute usage to particular roles/states across different platforms and/or management software, the inability the inability to correlate results/performance with survey analytics in a meaningful way, and the inability to measure performance and usage over time across different platforms and/or management software. In addition, the different platforms generally have, or generate, different formats and configurations of data, which makes it untenable to accurately trend data or correlate timing of ground truth data, etc.

For the foregoing reasons, there is a need for big-data view integration systems and methods configured to generate integration GUIs.

BRIEF SUMMARY

As disclosed herein, big-data view integration platform is configured for generation of integration GUIs. In various embodiments, the big-data view integration systems serve as comprehensive office management tools that allows end users (e.g., agents) to create and track their business goals, track day to day activities, e.g., with a digital whiteboard, to provide incentives for office personnel (e.g., staff) as they meet their goals. As described herein, the big-data view integration systems and methods provides this cross-platform support through business data integration in a connected, unified platform. Generally, the platform consists of several layers that provide data integration from a variety of services, including legacy and non-legacy services. Data, as integrated by the big-data view integration platform, is sourced in a variety of protocols and implementations, including, e.g., push-based data, pull-based data, and event/queue based data.

As described in various embodiments herein, a big-data view integration platform may be configured to generate integration guided user interfaces (GUIs). The big-data view integration platform may include a first edge node configured to ingest push-based data and pull-based data from a plurality of platform services. In some embodiments, at least one of the plurality of platform services may be a legacy platform service. Legacy platform services may, for example, use a first communication protocol (e.g., a legacy protocol).

The big-data view integration platform may further include an event-based queue configured to receive a plurality of queue events. In some embodiments, a first set of queue events may include indirect push-based data as received from the first edge node. In further embodiments, a second set of queue events may include direct push-based data as received directly from a non-legacy platform service. In various embodiments, the non-legacy platform service uses a second communication protocol that is incompatible with the first communication protocol.

The big-data view integration platform may further include a conformity component configured to integrate the push-based data, the pull-based data, and the plurality of queue events into integration data having an enhanced integration format. In such embodiments, the conformity component may be further configured to interoperate data received via the first communication protocol and the second communication protocol via the enhanced integration format. In some embodiments, the integration data may be filtered into a plurality of subject types.

The big-data view integration platform may further include a view integration component configured to generate a plurality of data views from the integration data and the plurality of subject types.

The big-data view integration platform may further include a second edge node exposing the plurality of data views via an access services application programming interface (API). The access services API may be implemented as a representational state transfer API. In addition, the access services API may be accessible via a computer network.

The big-data view integration platform may further include a new service execution component configured to access the access services API via the computer network. Each access may include the new service execution component generating an integration GUI based on the data views as accessed from the access services API. In some embodiments, the integration GUI may be configured to be provided to an application layer of a technical end-user platform. The integration GUI may include at least a portion of the integration data, e.g., including at least one of: (1) legacy data from the legacy platform and non-legacy data from the non-legacy platform; and/or (2) a portion of the push-based data, a portion of the pull-based data, and a portion of data from at least one queue event of the plurality of queue events.

Further embodiments include a tangible, non-transitory computer-readable medium storing instructions for generating a digital whiteboard guided user interface (GUI). Such tangible, non-transitory computer-readable medium may be provided to (e.g., to one or more memories) of a big-data view integration platform as described herein. For example, the instructions may be implemented on one or more processors of the big-data view integration platform, where the instructions may cause the big-data view integration platform to receive, at an edge node of a big-data view integration platform, each of push-based data, pull-based data, and queue based data from a plurality of platform services. In some embodiments, at least one of the plurality of platform services may be a legacy platform service.

The instructions may further cause the big-data view integration platform to integrate the push-based data, the pull-based data, and the queue based data into integration data having an enhanced integration format.

The instructions may further cause the big-data view integration platform to generate a digital whiteboard GUI including at least a portion of the push-based data, pull-based data, and queue based data.

In some embodiments, the generated digital whiteboard GUI may be configured to initiate an asynchronous call to the big-data view integration platform to pre-populate a first dynamic field with a second portion of the push-based data, pull-based data, and queue based data. In such embodiments, the generated digital whiteboard GUI may further be configured to generate a second dynamic field based on a selection of the first dynamic field by a user. The user selection may cause the digital whiteboard GUI to initiate a second asynchronous call to the big-data view integration platform to pre-populate the second dynamic field with a third portion of the push-based data, pull-based data, and queue based data.

As will be further appreciated from the disclosure herein, the big-data view integration platform provides a comprehensive and data integrated management tool suite that helps end users (e.g., agents and their team) to efficiently manage their operations. For example, the big-data view integration platform may provide end users with the information and tools needed to maximize the effectiveness of their office and achieve business goals. In addition, the big-data view integration platform may further assist end users to efficiently manage their business planning and execution, market opportunities, and incentives initiatives all in one place with integrated business data from various business areas. As the big-data view integration platform provides a comprehensive and integrated view of a business operation, it facilitates consistency on how to drive towards enterprise goals and increase collaboration between enterprise, territories, and end users (e.g., agents) regarding business plans, goals and achieved results. Thus, these tools and their insights helps end users proactively manage performance and incentives.

For example, data integration of the enterprise-level business data, as provided by the big-data view integration platform, may assist end users realize, and/or visualize, actual results in association with their goals and accomplished activities. Such data integration may also provide robust incentive plans for team members and assist end users understand business goal alignment with enterprise goals. Data integration may also allow visualization of actual achieved goals to planned goals. Such insights may assist end users re-adjust strategies or employee count to meet needs, etc., of the business. Data integration may also provide a more comprehensive view of end user and/or team member activities in a live, or real-time, environment (by data integration from policy system, e.g., bank and/or mutual fund systems) to enable them to incentivize their team how they choose. Data integration may further provide unprecedented views of team member engagement and ability (by overlaying business data with other available information to produce multidimensional views of agent team members work).

The big-data view integration platform provides a cross and/or unified platform solution giving operators of the big-data view integration a key market differentiator when compared to typical office management platforms and/or software. The big-data view integration platform provides a cross and/or unified platform solution providing operational efficiency by unifying data integration and reducing reliant on redundant, and/or non-connected software or platforms. An enterprise implementing the big-data view integration platform further benefits by gaining feedback and insight into end user (e.g., agent) office performance. Such feedback may, for example, may be used to support such end users. This feedback can also assist in the development of forward looking indicators or to support, e.g., sales leaders and territory teams, understand how to move forward with business level support for end users.

The big-data view integration platform further provides views and GUIs that are useful for visualizing or rendering, e.g., comparisons of actual results to goals, accomplished activities, customized incentive plans for team members, etc. The views and GUIs that may be generated may further be useful for visualizing or rendering business goal alignment with enterprise goals. For example, such visualizations may be useful to assist end users re-adjust strategies or engage or hire additional employees to meet needs, etc. The views and GUIs that may be generated may further be useful for providing a comprehensive view of end user (e.g., agent) and/or team member activities in a live/real-time environment (e.g., by data integration from policy system, bank and mutual fund systems) to enable them to incentivize their team how they choose. The views and GUIs that may be generated may further be useful for providing unprecedented views of end user and/or team member engagement and ability (e.g., by overlaying business data with other available information to produce multidimensional views of agent team members work).

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 3 illustrates a diagram regarding certain features of the big-data view integration platform of FIG. 1 in accordance with various embodiments disclosed herein.

FIGS. 6A and 6B illustrate additional example embodiments of GUIs associated with digital whiteboards of the big-data view integration platform of FIG. 1 in accordance with various embodiments disclosed herein.

FIG. 7 illustrates a further example embodiment of a GUI associated with a digital whiteboard of the big-data view integration platform of FIG. 1 in accordance with various embodiments disclosed herein.

FIG. 9 illustrates a second example embodiment of an incentive GUI associated with the big-data view integration platform of FIG. 1 in accordance with various embodiments disclosed herein.

FIG. 10 illustrates a third example embodiment of an incentive GUI associated with the big-data view integration platform of FIG. 1 in accordance with various embodiments disclosed herein.

FIG. 11 illustrates a fourth example embodiment of an incentive GUI associated with the big-data view integration platform of FIG. 1 in accordance with various embodiments disclosed herein.

FIG. 12 illustrates a fifth example embodiment of an incentive GUI associated with the big-data view integration platform of FIG. 1 in accordance with various embodiments disclosed herein.

FIG. 13 illustrates a sixth example embodiment of an incentive GUI associated with the big-data view integration platform of FIG. 1 in accordance with various embodiments disclosed herein.

FIG. 14 illustrates a seventh example embodiment of an incentive GUI associated with the big-data view integration platform of FIG. 1 in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION

Figure 1:
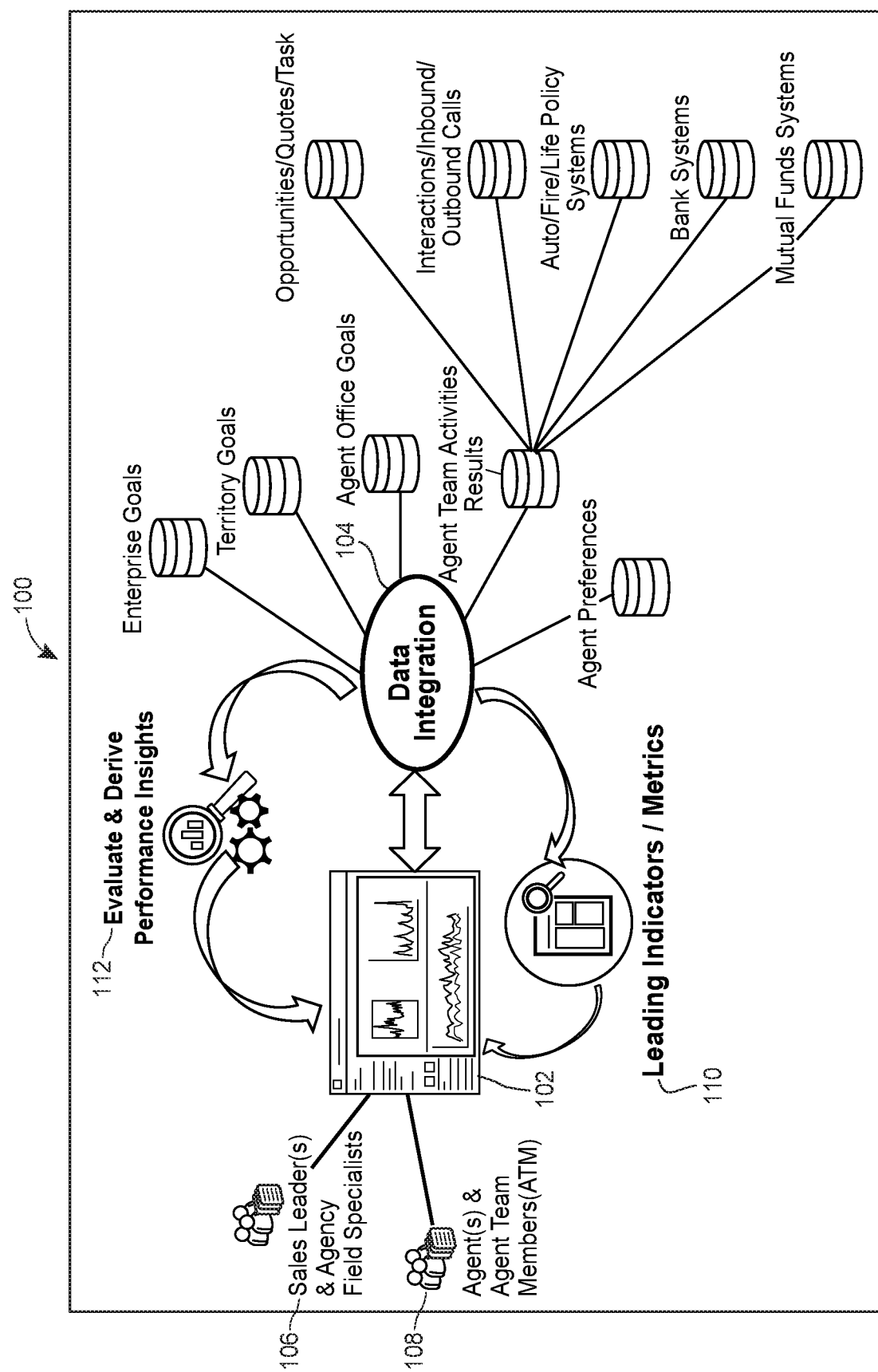
FIG. 1 illustrates a diagram of a big-data view integration platform configured to generate integration GUIs in accordance with various embodiments disclosed herein.

FIG. 1 illustrates a diagram 100 of a big-data view integration platform configured to generate integration GUIs in accordance with various embodiments disclosed herein. For example, as shown in diagram 100, data integration 104 may include generating new or transformed data from a plurality of data sources generated, recorded, and/or aggregated from various different platforms or other services (e.g., cloud platforms, local or remote servers, end user applications executing in real-time generating events, etc.) where the new integration data is enhanced with an enhanced, cross-platform integration format. Each of the disparate data sources may provide data for integration via a variety of communication protocols and in a variety of different communication or data types, including, but not limited to, push-based data, pull-based data, and message, queuing, and/or event based data. Generally, push-based data is data that is transmitted, without a request, from a source, platform service, or other computing device. Pull-based data, in contrast, is data that is transmitted, based on a request, from a source, platform service, or other computing device. Queue or event based data (i.e., queue based data and/or a queue event) is data that has been scheduled, in relation to other events or data, and is transmitted in a determined order (e.g., a first-in-first out order or a last-in-last out order). Such data may be ingested by a big-data view integration platform as described herein.

The data integration 104 component of the big-data view integration platform of diagram 100 enhances the received data with an enhanced integration format that streamlines and makes more efficient the integration data (e.g., via map reduce, filtering, data reduction, data correlation, new data generation, extrapolation of data, leading indicators, trend analysis, etc.) in order to produce a correlated, unified, and/or cross-platform efficient data (e.g., integration data) for use as described herein. For example, such integration data may be used to generate integration GUIs and the like as describe herein.

For example, as shown in FIG. 1, an integration GUI 102 based on integration data having an enhanced integration format may be generated and rendered with leading indicators/metrics 110 determined from the integration data. In addition, integration GUI 102 may be generated and rendered visualizing evaluations and derivations of performance insights 112 determined from the integration data. Integration GUI 102 may be provided to end users 106 and/or 108, benefiting such end users by coalescing the integration data, and generated data therefrom (e.g., leading indicators/metrics 110 and/or evaluations and derivations of performance insights 112 determined) via a single integration GUI 102. Generally, integration GUI 102 is made possible by the big-data view integration platform, and would not be possible, without the integration features described herein. Therefore, integration GUI 102 provides an improvement over the prior art because prior art systems were limited in their ability to integrate and/or coalesce data at a large scale, especially when such data is received in real-time or near real-time. The big-data view integration platform solves such issues where data received in real-time or near real-time from a plurality of platform services is processed in real-time or near real-time to provide updates and/or Integration GUI 102 in real-time or near real-time.

In a particular embodiment, the big-data view integration platform is referred to as an "Agency Suite of Tools" (AST). In such embodiments, end users may be referred to as agents of an enterprise, where the enterprise provides the big-data view integration platform as a tool and resource to the agents for data integration services as described herein. The agents may have team members that work with the agents to perform operations. Agents and/or team members may utilize the big-data view integration platform to perform such operations. It is to be understood, however, that the disclosure herein is not limited to the AST embodiment, but rather the AST embodiment is one of many possible implementations for the big-data view integration platform.

Figure 2:
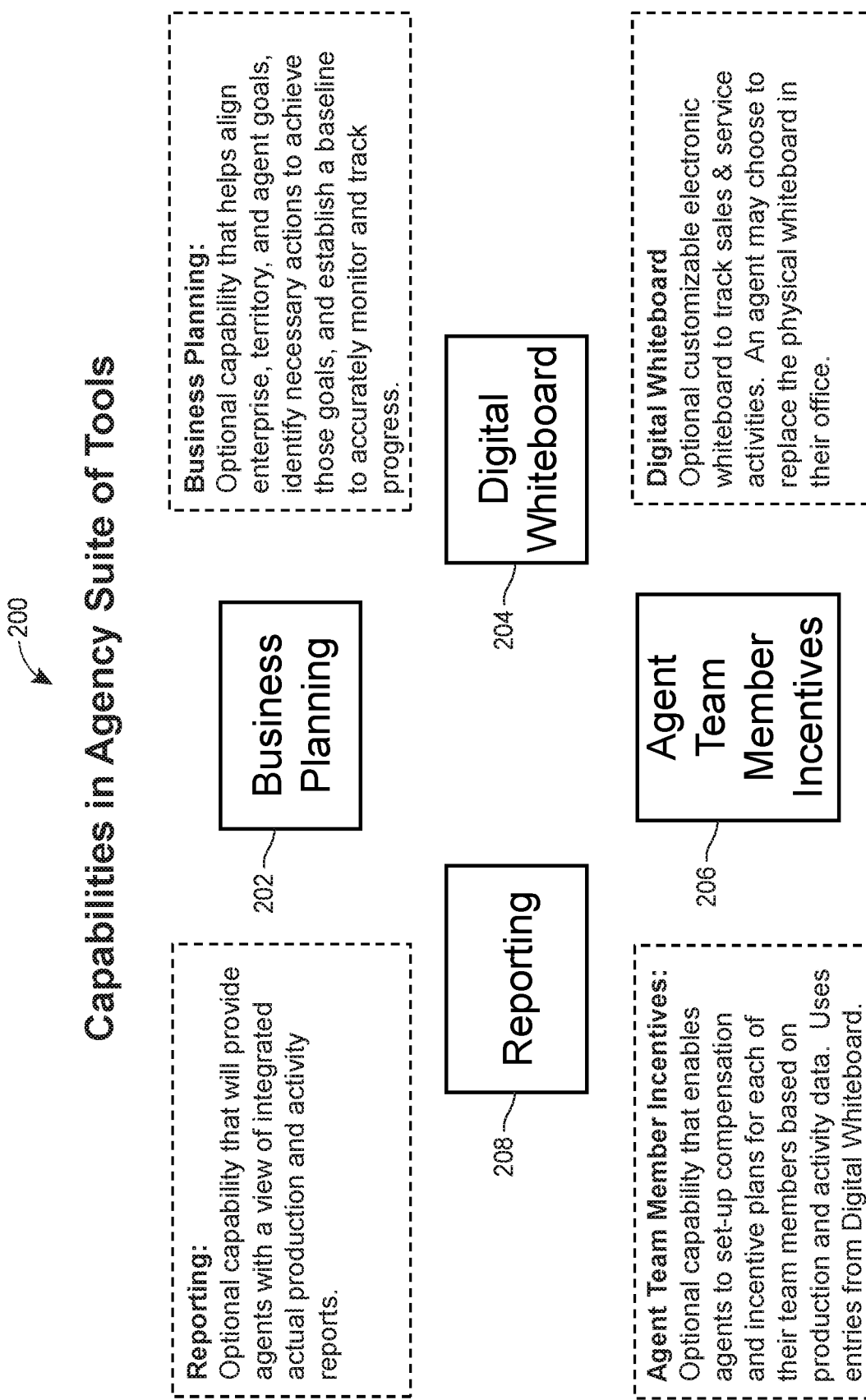
FIG. 2 illustrates a block diagram regarding a suite of software tools associated with the big-data view integration platform of FIG. 1 in accordance with various embodiments disclosed herein.

FIG. 2 illustrates a block diagram 200 regarding a suite of software tools associated with the big-data view integration platform of FIG. 1 in accordance with various embodiments disclosed herein. In the example embodiment of FIG. 2, the suite of software tools relates to a suite of tools containing business management tools and analytical capabilities to assist end users (e.g., agents) align business goals with enterprise goals and grow agency-related business more efficiently. Block diagram 200 illustrates four example components, which may be independent, but unified and/or cross-platform tools or components, representing example software tools, that may be, or be associated with, integrated GUIs. In particular, such example components include a business planning component 202, digital whiteboard component 204, team member incentives component 206, and reporting component 208. In some embodiments, components 202-208 may communicate, or interoperate with, one another therefore being interoperable components in the cross-platform system as provided by the big-data view integration platform described herein.

Business planning component 202 includes, for example, but is not limited to, integrated GUIs that assist end users to align enterprise, territory, and agent goals, identify necessary actions to achieve those goals, and establish a baseline to accurately monitor and track progress.

Digital whiteboard component 204 includes, for example, but is not limited, integrated GUIs that include customizable electronic whiteboard to track sales and service activities. For example, in some embodiments, digital whiteboard reports may be generated based on activity type or other metrics as described herein. In various embodiments, digital whiteboard entry data may be ingested into the big-data view integration platform as push, pull, and/or queue based data. In still further embodiments, digital whiteboards may be pre-populated with data, e.g., eliminating the need for manual entries into the digital whiteboard.

In general, digital whiteboards of the big-data view integration platform provides end users with an electronic whiteboard, that is customizable, and that may be used to track production and service activities. Through the big-data view integration platform, the digital whiteboard offers permanent data capture solutions across various activities. For example, the digital whiteboard may be used to electronically assign activities to end users and/or team members. In some embodiments, entering of quotes, applications, and other activities is automated by the digital whiteboard. In addition, digital whiteboards may include a reporting capability that allows end users (e.g., agents) to access detailed activity reports by team member or level at an office level. In further embodiments, a digital whiteboard may provide a basis for push or pull based data for incentive activity as described herein.

In some embodiments, digital whiteboards are provided as an optional feature, where digital whiteboards provide end users with the ability achieve business goals by being able to set clear expectations, monitor and lead team sales and service activities in real-time and identify coaching opportunities for team members.

Team member incentives component 206 includes, for example, but is not limited, integrated GUIs that enable end users (e.g., agents) to set-up compensation and incentive plans for each of their team members based on production and activity data. Such embodiments, utilize push, pull, queue based data and entries from digital whiteboard embodiments.

Reporting component 208 includes, for example, but is not limited, integrated GUIs that provide end users with views or renderings of integrated actual production and activity reports. For example, in some embodiments, reporting component 208 may pull data from automatic weekly production reports. Such implementation integrates an automatic comparison of business plan goals with actual production that can be viewed as a dashboard on integrated GUI(s).

FIG. 3 illustrates a diagram 300 regarding certain features of the big-data view integration platform of FIG. 1 in accordance with various embodiments disclosed herein. In particular, the diagram 300 relates to benefits associated with business planning, such as would be achieved via business planning component 202 as described herein. For example, business planning component 202 may receive push, pull, or queue data related to electronic business plans as submitted by end users. Business planning component 202 may be interactive, e.g., allow updates to an electronic business plan, via GUIs, or other tools and/or components as described herein.

For example, in a goal based component, end users may choose to electronically set and distribute goals and action plan items to individual team members. In such embodiments, an electronic plan may automatically be saved and can easily be accessed throughout a period of time (e.g., a year). Additionally, or alternatively, the electronic plan may allow for mobile access via smart phone or tablet through components as described herein and/or mobile platforms or applications (apps).

In a further example, a strategy based component, which may include business specific tools (e.g., an Auto Gain Strategy tool and/or a Fire Gain Strategy tool), may be built-in and part of the goal based feature. The tools may include components that determine what specific activities are needed to accomplish the set goals.

In a further example, an action plan based component may be used with the goal and strategy features, that allows the end user to provide what specific marketing activities are needed to accomplish the desired goal. This allows an end user to start thinking about how the goals will be accomplished.

In a further example, a goal distribution based component may be used to formulate team members who will be responsible for what activities and generate a team plan. The goal distribution based feature can distribute goals and action items. In some embodiments, team members may be assigned their own, mini-team member plan as part of a lager electronic plan. Such detailed level of planning may be result in shared accountability among the team. Various integration GUIs, as described herein, may provide access to the goal distribution based feature, e.g., to visit their "distributed/assigned" goal.

In a further example, a team access based component may be used to allow team members, regardless of status, to access the big-data view integration platform. Certain end users (e.g., agents) may allow a business plan, or certain parts thereof, to become a shared team goal.

In a further example, a reporting based component may include integrated, automatic reporting and dashboards on an application layer (e.g., a homepage) for weekly updates with the most recent data available for each line of business. In some embodiments, the business planning component 202 may implement the reporting based feature.

In a further example, a target based component may be used determine or generate reports showing goals and actual production and generate dashboards that compare set goals to actual production. Such reports and/or dashboards may help end user(s) monitor progress throughout a year, weekly basis, or other time period.

In various embodiments, each of the above example components and features may be accessed, updated, or otherwise manipulated via dashboards and/or components through the application layer (e.g., via a homepage) of the a technical end-user platform, e.g., to provide homepage visuals. Such information in provided in a unified, "one stop, one tool," which provide a singular electronic location for planning and reporting. In such embodiments, data pulled, pushed, and/or queued from various sources is integrated, via the big-data view integration platform into singular view(s) as described herein.

Figure 4:
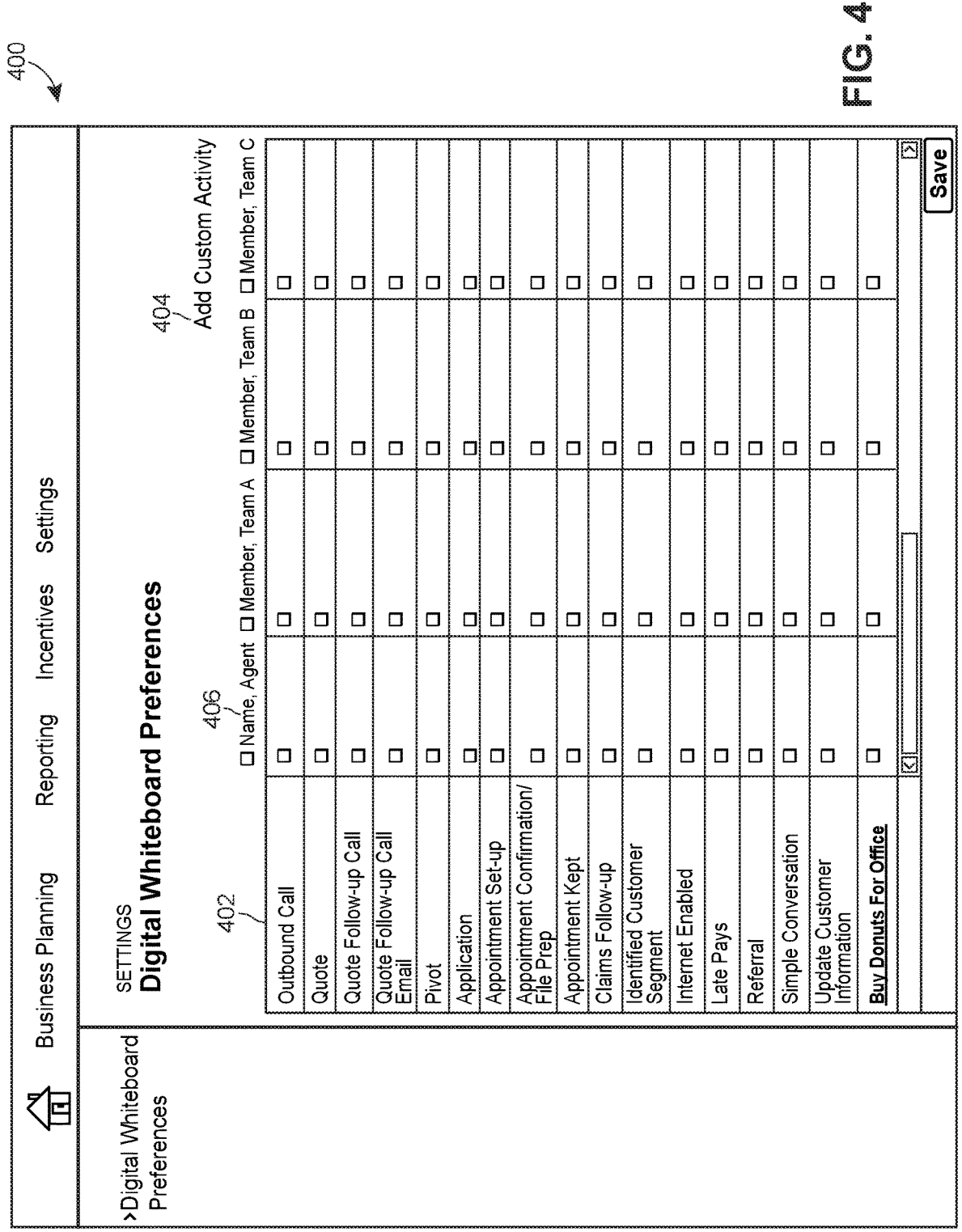
FIG. 4 illustrates an example embodiment of a GUI associated with a digital whiteboard of the big-data view integration platform of FIG. 1 in accordance with various embodiments disclosed herein.

FIG. 4 illustrates an example embodiment of a GUI 400 associated with a digital whiteboard of the big-data view integration platform of FIG. 1 in accordance with various embodiments disclosed herein. In particular, FIG. 4 represents a GUI for setting certain preferences 402 for operation of digital whiteboards in certain embodiments. The preferences 402 can be used to determine what activities to track, e.g., for team members or other end users 406 of the big-data view integration platform. For example, preferences 402 include tracking outbound calls, quotes, applications, appointment setting, pivots, claims follow-up, and late pays, etc. as illustrated in FIG. 4. In the embodiment of FIG. 4, the preferences 402 may represent default activities to select from. In other embodiments, an end user may also select an option 404 (e.g., the Add Custom Activity link (upper right hand corner on screen)) to create new or customized activities to track. In general, there is no limit as how many custom activities that may be added in order to customize a digital whiteboard.

In some embodiments, a digital whiteboard GUI may be used to update or implement incentives as described herein. In such embodiments, custom preferences may be created to track activities to incentivize (e.g., track activities for which to compensate team members for within the Digital Whiteboard). For example, the data view integration platform may base its compensation calculations on the digital whiteboard entries.

In some embodiments, certain end users (e.g., agents) may be allowed to access and select preferences. In other embodiments, such end users may delegate this responsibility to other, less credentialed, end users (e.g., team members).

Figure 5:
FIG. 5 illustrates a second example embodiment of a GUI associated with a digital whiteboard of the big-data view integration platform of FIG. 1 in accordance with various embodiments disclosed herein.

FIG. 5 illustrates a second example embodiment of a GUI 500 associated with a digital whiteboard of the big-data view integration platform of FIG. 1 in accordance with various embodiments disclosed herein. In particular, GUI 500 illustrates example activity types 502 that may be selected by end users. An end user may customize the activity type to track via GUI 500. In some embodiments, as described herein, an end user (e.g., agent) may set up preferences as to which activities a team member will be tracking.

FIGS. 6A and 6B illustrate additional example embodiments of GUI 600 and GUI 650 associated with digital whiteboards of the big-data view integration platform of FIG. 1 in accordance with various embodiments disclosed herein. In particular, FIGS. 6A and 6B illustrate example reporting capabilities associated with digital whiteboards. In the embodiment of FIGS. 6A and 6B, there are generally two types of reports. One type of report (e.g., an office report) visualizes a total for an end user (e.g., an agent) and all agent team member for activities entered into a digital whiteboard. In some embodiment, only certain users (e.g., agent) has access to the office report. A second type of report is an individual agent team member report which shows all activities for that individual team member in detail, including customer names. In such embodiments, an agent may access each of the agent team member's reports.

FIGS. 6A and 6B represent the second type of report, showing a report 602 for an individual team member ("Diane Trennert"). The report 602 includes two sections, a list view 604 and a table view 606. The list view, illustrated by FIG. 6A, provides a quick numeric summary of what and how many activities were completed in a selected time frame. The table view, illustrated by FIG. 6B, allows a team member to edit activities. The table view may be important with respect to allowing applications to change the status from "written" to "issued" (e.g., for insurance products). In the embodiment of FIG. 6B, the table view 606 can also be sorted by different parameters 608, e.g., date, customer name, activity, line of business (LOB), Issued Date, and status.

FIG. 7 illustrates a further example embodiment of a GUI 700 associated with a digital whiteboard of the big-data view integration platform of FIG. 1 in accordance with various embodiments disclosed herein. In particular, GUI 700 may be used to initiate incentive plans. In the embodiment of FIG. 7, such plans may be initiated by entry of fields shown in GUI 700, e.g., including a name of the plan. Alternatively, or additional, a user may select an existing plan and/or may edit such exiting plan. An end user may also determine how to run the bonus plan and pay out incentives. An end user may also determine whether to provide incentives on apps, quotes, or activities, including custom activities. In addition, an end user may assign team member/s to the plan. An end user may also assign multiple agent team members to the same plan. For example, an entire sales team could be assigned to a "Sales Bonus" plan. Also, a team member can be associated with more than one plan. For example, team member "Mike" could be assigned to both the "Sales team Bonus plan" plus a "Fast Start" bonus plan. In general, certain users (e.g., agents) make decisions regarding incentives and how they compensate team members. Team member incentives component 206 may provide back-end processing of the big-data view integration platform.

In general, GUI 700 and team member incentives component 206 are optional tools that may be used by certain users (e.g., agents) to drive compensation decisions with team members. Such plans are customizable and can be as basic or as sophisticated as the agent chooses. Such plans may be customized with a variety of features. For example, features may include features that allow incentives on applications, quotes and activities, including custom activities. Such features may allow you to incentivize on the end result, meaning apps, and also on leading activities. Such incentives may provide motivation for a team member to consistently perform certain activities, such as asking for referrals. This could also include any custom activities that certain end users (e.g., agents) deem important to the office.

An example custom activity implemented for an incentive program could include any of tracking the number of quotes that include a driving program (e.g., "Drive Safe and Save") or the number of simple conversations team members have with potential clients. Other tracking metrics may include tracking monthly marketing activities that would lead to attracting small business clients or owners.

In a further example, custom activity implemented for an incentive program can be used to allow incentives based on written or issued electronic applications related to the underlying business. For example, written or issued electronic applications may result in a pay per count based totally on app count (e.g., pay $10 per life policy, such that two life policies is $20). Additionally, or alternatively, written or issued electronic applications may result in pay per percentage of premium/compensation based on premium (e.g., higher face value will earn you a higher bonus). Additionally, or alternatively, written or issued electronic applications provide unlimited tiers where the more a team member produces, the higher the incentive amount. For example, for the first five auto applications, a team member may receive $1 a piece, and over six auto applications, a team member may receive $10 a piece. Tier options may be stacked, where each policy/activity may be paid an incentive payout for that particular tier. Tier options may also be retroactive, where once a next tier level is reached, every policy, starting with the first one, may receive the higher payout.

The big-data view integration platform may pull data (or receive push or queue data) regarding activities, incentive information, or other data, e.g., from GUI 700, or other GUIs described herein. For example, the big-data view integration platform uses activities as tracked in a digital whiteboard to determine incentives.

GUI 700 and/or team member incentives component 206 may be enhanced with "entry point" and/or "tier" type enchantments. For entry point incentives, the team member incentives component 206 may set requirements that must be met first, before any incentive will be paid. That is, an "entry point" is a requirement. Such an entry point allows for production in other lines of business being tied to any incentive (e.g., bonus). In one example, a team member may be required to have at least two life quotes and two referrals during a compensation period before any bonus is being paid. For entry point incentives, the team member incentives component 206 may require a team member to focus on other aspects outside of that particular line in order to earn a higher bonus. For example, team member incentives component 206 may require focus on vehicle loan production. In such embodiments, a team member could double their auto bonus if they also sold a vehicle loan.

Enhancements to team member incentives component 206 also include where production and activities are pulled in automatically to eliminate the need for an end user member to have to customize certain activities via a digital whiteboard as described herein.

Further enhancements to team member incentives component 206 also include providing an option of a "team bonus" where if an entire office produces a certain amount together, an additional bonus would be paid. Other enhancements include providing split incentives, where agent team members share in the bonus.

Figure 8:
FIG. 8 illustrates an example embodiment of an incentive GUI associated with the big-data view integration platform of FIG. 1 in accordance with various embodiments disclosed herein.

FIG. 8 illustrates an example embodiment of an incentive GUI 800 associated with the big-data view integration platform of FIG. 1 in accordance with various embodiments disclosed herein. In particular, FIG. 8 represents an example embodiment of an incentive based GUI, where end users may select certain lines of business 802 on which to provide incentives and respective incentive types 804. End users may use the GUI 800 to implement incentives as described herein, e.g., for GUI 700 and GUI 900.

FIG. 9 illustrates a second example embodiment of an incentive GUI 900 associated with the big-data view integration platform of FIG. 1 in accordance with various embodiments disclosed herein. In particular, GUI 900 illustrates a specific embodiment of GUI 800. Based on what is selected, the screens and options will populate the additional fields for an end user to complete. In some embodiments, the fields may be populated via asynchronous calls (e.g., asynchronous JavaScript and extensible markup language (AJAX) calls) to the big-data view integration platform.

For example, an end user may use GUI 900 to incentivize on the "auto" line 902 of business for "raw new auto" polices. The screen updates with a Raw New Auto section 904, where the end user may then decide whether to incentivize on written applications or on issued applications. Within the same section, the end user may select field options 906, e.g., options regarding whether to incentivize a flat dollar amount per count, percentage of premium, or set up tiers. In the embodiment of FIG. 9, the "tier" options is selected. In further embodiments, a next question may follow, e.g., whether the tiers would be stacked (payout is a graduated amount for each tier) or retro (payout follows the highest achieved tier for ALL policies, starting with the first one). In this way GUI 900 provides dynamic fields that continue to populate based on what is selected.

FIG. 10 illustrates a third example embodiment of an incentive GUI 1000 associated with the big-data view integration platform of FIG. 1 in accordance with various embodiments disclosed herein. In particular, GUI 1000 demonstrates an entry point GUI. GUI 1000 provides options 1002 regarding the type or number of conditions that must be met for an entry point. The "any" option means only one condition must be met. The "all" option means that all conditions that were set up must be met. The "advanced" options allows mixed conditions. In the embodiment of FIG. 10, an end user (e.g., agent) set an entry point requirement for a team. In such an embodiment, and with reference to GUI 900 of FIG. 9, the Raw New Auto bonus as mentioned for GUI 900, would only be paid if 10 outbound calls and 5 life pivots are complete by a particular team member as specified by the criteria 1004 of GUI 1000.

FIG. 11 illustrates a fourth example embodiment of an incentive GUI 1100 associated with the big-data view integration platform of FIG. 1 in accordance with various embodiments disclosed herein. In particular, GUI 1100 visualizes a screen that would be rendered where the "advanced" option was selected in GUI 1000 as described herein. In GUI 1100, an end user may decide what conditions need be met. The end user may also select Boolean and parenthetical options 1102 to link each condition. An entry point formula 1104 may be generated that summarizes end user selections. In this way, GUI 1100 provides flexibility and end user control.

FIG. 12 illustrates a fifth example embodiment of an incentive GUI 1200 associated with the big-data view integration platform of FIG. 1 in accordance with various embodiments disclosed herein. In particular, GUI 1200 illustrates a summary on an incentive plan. In some embodiments, GUI 1200 allows an end user to confirm all prior incentive selections. As shown by GUI 1200, the summary may indicate which team members the plan is applicable. Tabs 1202 may illustrate what specific type of incentive plan(s) were created. Save and continue later selection 1204 may save the incentive data to the big-data view integration platform.

FIG. 13 illustrates a sixth example embodiment of an incentive GUI 1300 associated with the big-data view integration platform of FIG. 1 in accordance with various embodiments disclosed herein. In particular GUI 1300 illustrates a further embodiment of an incentive plan summary screen regarding incentive plans 1302 generated by an end user (e.g., agent). For example, in the embodiment of FIG. 13, two incentive plans were generated, e.g., "Service Team" and "Sales Team." The incentive plans 1302 show the team member(s) associated with the respective incentive plans. Each incentive may be edited or deleted.

Figure 14:
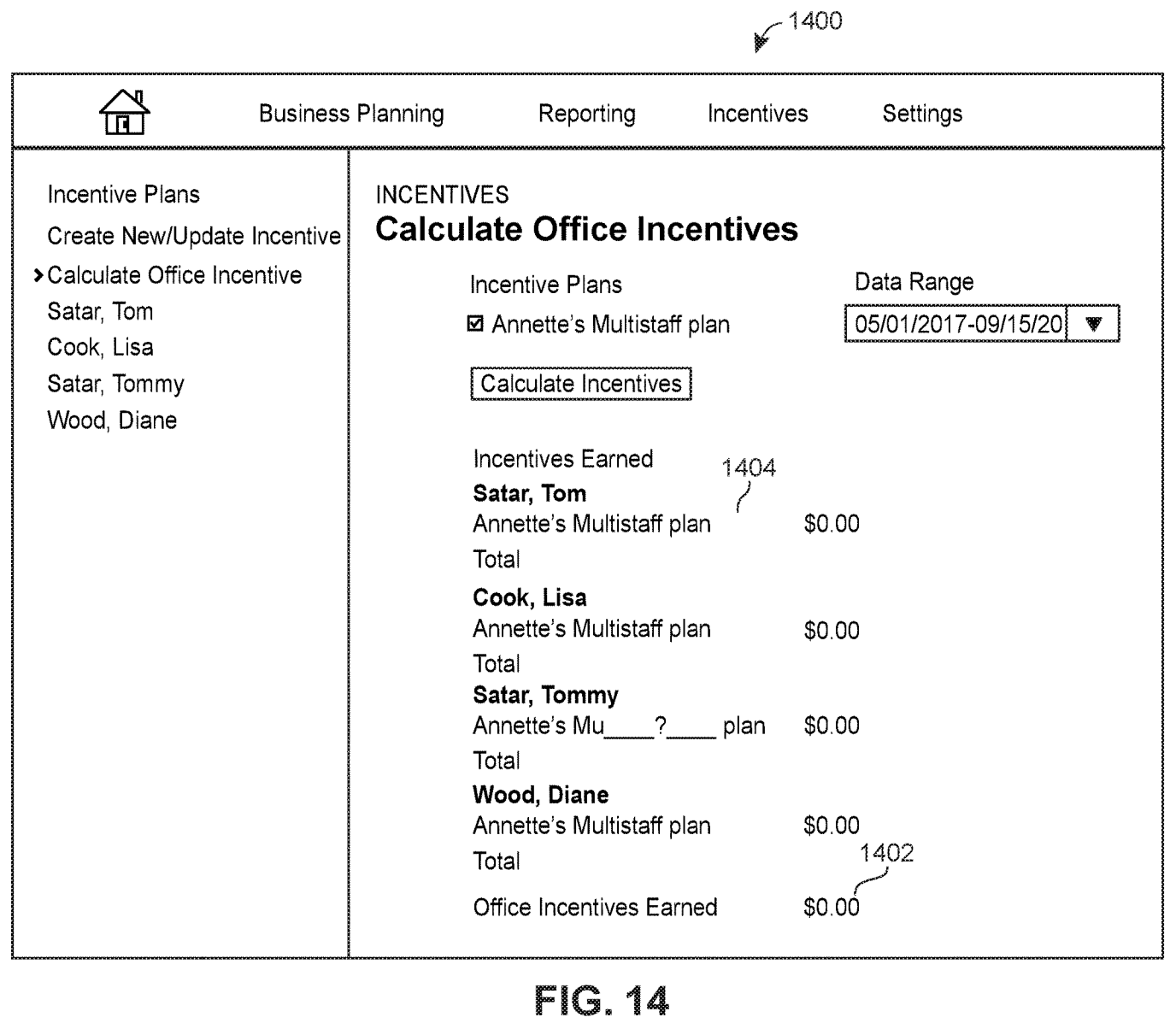

FIG. 14 illustrates a seventh example embodiment of an incentive GUI 1400 associated with the big-data view integration platform of FIG. 1 in accordance with various embodiments disclosed herein. In particular, GUI 1400 illustrates a compensation report. The compensation report shows an aggregate amount 1402 (e.g., total plan pay out) for a particular incentive particular plan as well a team member amount 1404 for any team member who is included in the plan. Each team member name may be selected to generate a summary for the particular team member.

For each of the GUIs 400-1400 as described herein, the options, selections, or data is provided to the big-data view integration platform as push-based data, pull-based data, and/or queue based data in either an asynchronous or synchronous manner. In some embodiments, the data is sourced from a variety of databases as described herein. In this way, big-data view integration platform operates as a tool that end users (e.g., agents) can use to manage and assist with business planning and monitor progress throughout the year, including data automation and intuitive analytics with a focus on leading, actionable indicators.

Figure 15:
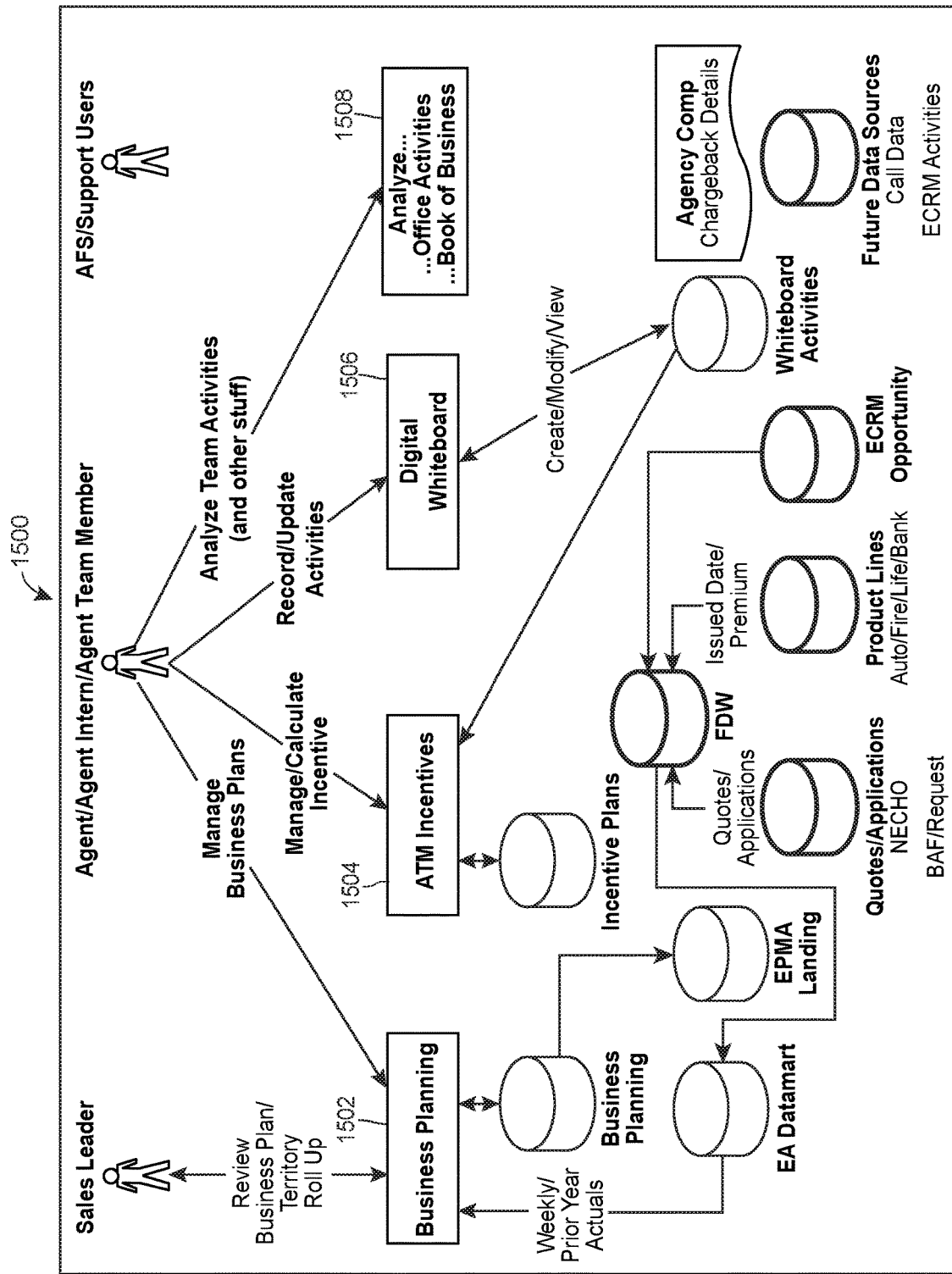
FIG. 15 illustrates a flow-diagram associated with the big-data view integration platform of FIG. 1 in accordance with various embodiments disclosed herein.

FIG. 15 illustrates a flow-diagram 1500 associated with the big-data view integration platform of FIG. 1 in accordance with various embodiments disclosed herein. Flow-diagram 1500 illustrates example GUIs, including business planning GUI 1502, incentive GUI 1504, and digital whiteboard GUI 1506, and reporting GUI 1508, which each may correspond to business planning component 202, digital whiteboard component 204, team member incentives component 206, and reporting component 208, respectively, as described herein. GUIs 1502-1508 may be accessed by end users as illustrated in flow-diagram 1500. GUIs 1502-1508 may relate to, or be associated with, GUIs 400-1400 as described herein.

As shown in the embodiment of FIG. 15, GUI 1502 may generate push data, pull data, and/or queue based data, e.g., associated with managing and generating business plans. GUI 1504 may generate push data, pull data, and/or queue based data, e.g., associated with managing and calculating incentives as described herein. GUI 1506 may generate push data, pull data, and/or queue based data, e.g., associated with recording and updating activities associated with digital whiteboards as described herein. GUI 1508 may generate push data, pull data, and/or queue based data, e.g., associated with analyzing activities (e.g., team activities) as described herein. Such push data, pull data, and/or queue based data as generated, updated, or otherwise modified via GUIs 1502-1508 may be stored in, created in, and/or retrieved from the various databases and/or servers as illustrated in FIG. 15.

In various embodiments, the GUIs of the big-data view integration platform, including integration GUIs, as described herein, may be implemented in HyperText Markup Language (HTML), JavaScript, etc. The big-data view integration platform may be implemented via client-server technologies, such a Tomcat J2EE Servlet container, Java Server Pages (JSP), Active Server Pages (ASP), or client-server technologies. The GUIs of the big-data view integration platform may communicate with data view integration platform via client-server requests and responses, asynchronous calls (e.g., via asynchronous JavaScript and extensible markup language (XML), i.e., AJAX calls), and/or via representational state transfer (RESTful) application programming interfaces (APIs). Any of the push data, pull data, and/or queue based data may be stored in databases such as IBM's DB2, Oracle, MySQL, MongoDB, other SQL-based or NoSQL-based database, or other data stores. In general, the server or backend components of the big-data view integration platform may provide common core features across all "AST Application Layer" to provide data for, e.g., for digital whiteboard GUIs or other such integration GUIs and/or non-integration GUIs, etc.

Figure 16:
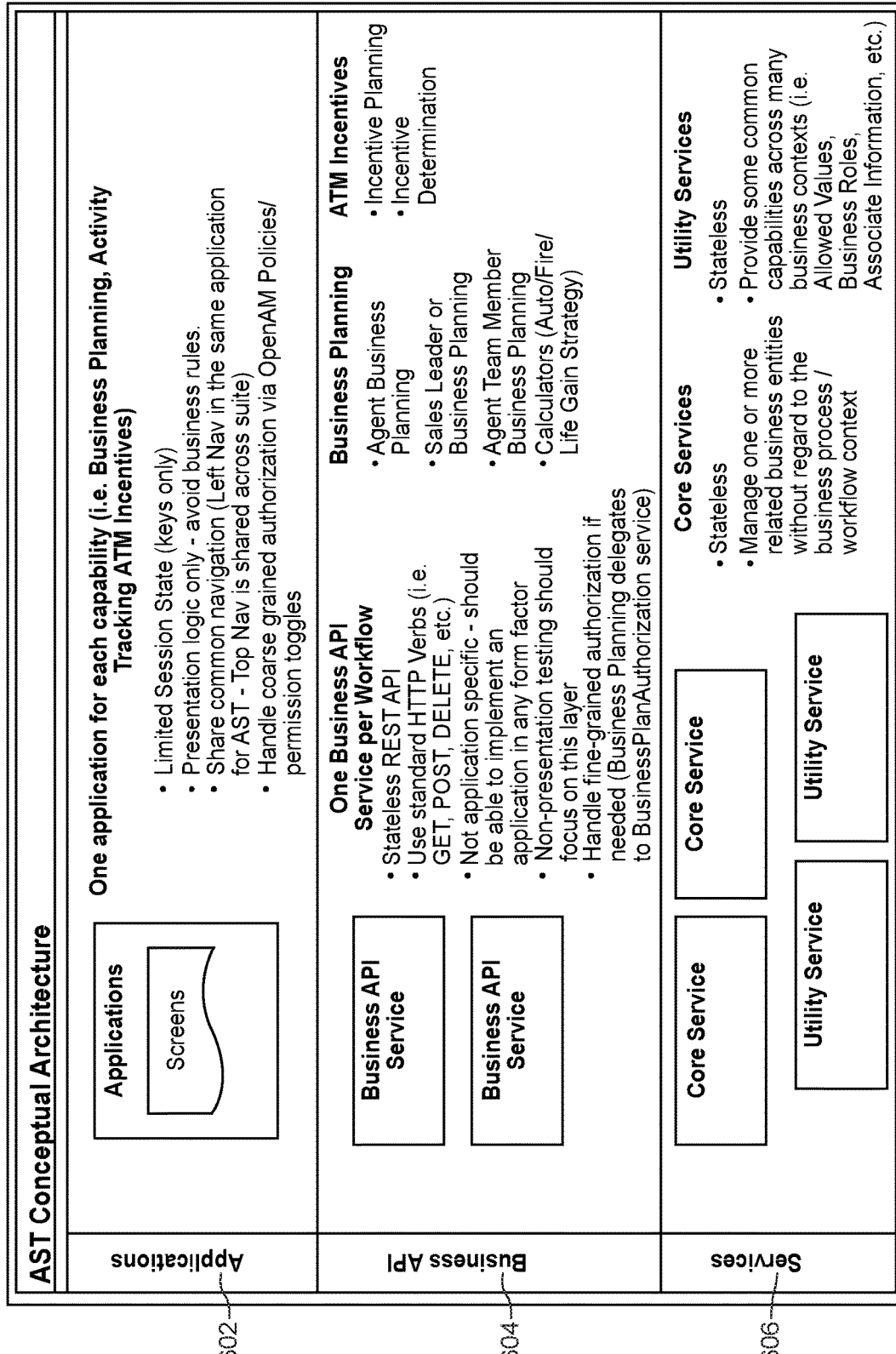
FIG. 16 illustrates an architecture diagram associated with the big-data view integration platform of FIG. 1 in accordance with various embodiments disclosed herein.

FIG. 16 illustrates an architecture diagram 1600 associated with the big-data view integration platform of FIG. 1 in accordance with various embodiments disclosed herein. In particular, architecture diagram 1600 illustrates component layers 1602-1606 of the big-data view integration platform. For example, application layer 1602 includes and/or provides GUIs or screens as generated as described herein. Application layer 1602 provides end users with singular applications for each capability of the big-data view integration platform (e.g., business planning, activity tracking, incentives, etc.). In some embodiments, application layer 1602 may be implemented via a limited session state (e.g., keys only). Additionally, or alternatively, application layer 1602 may be implemented using presentation logic only so as to avoid business rules with in the application layer. In still further embodiments, the screens/GUIs of may share common navigation features (e.g., left navigation in the same application and/or where a top navigation is shared across suites). Application layer 1602 may be configured to process or handle coarse grained authorization, e.g., via OpenAM Policies. Application layer 1602 may be configured to permit permission toggling.

API layer 1606 includes application programming interface(s) for communication with the application layer 1602. In some embodiments, API layer 1606 includes a singular business API service per workflow. Additionally, or alternatively, API layer 1606 may be implemented as a stateless RESTful API. In such embodiments, API layer 1606 may be configured to use standard HTTP protocol requests (e.g., GET, POST, DELETE, etc.). Additionally, or alternatively, API layer 1606 in configured to be non-application specific, e.g., such that API layer 1606 is operable to implement an application in any form factor. In some embodiments, the API layer 1606 is configured to process or handle fine-grained authorization if needed (e.g., via business planning delegates to e.g., a "BusinessPlanAuthorization" service, etc.).

API layer 1606 also provides API services for business planning as described herein. Such planning may include, e.g., planning regarding agent business, sales leader business, team member business, etc. Business planning services may also include determinations/calculators for specific business units such as auto, fire, life, and/or for gain strategies, etc.

API layer 1606 may also provide API services for incentives, which may include incentive planning and/or determinations as described herein.

Service layer 1608 includes core and utility services accessible by API layer 1606 (e.g., such as provided by a common Java Archive file, e.g., "ASTUtils"). For example, core services may include stateless services that allow digital management of one or more related business entities without regard to the business process or workflow context.

The core services may also provide utility services used by other services or functions as described herein. In some embodiments, utility services are stateless. Utility service generally provide common capabilities across many business contexts and data (i.e. allowed values, business roles, associate information, etc.).

Figure 17:
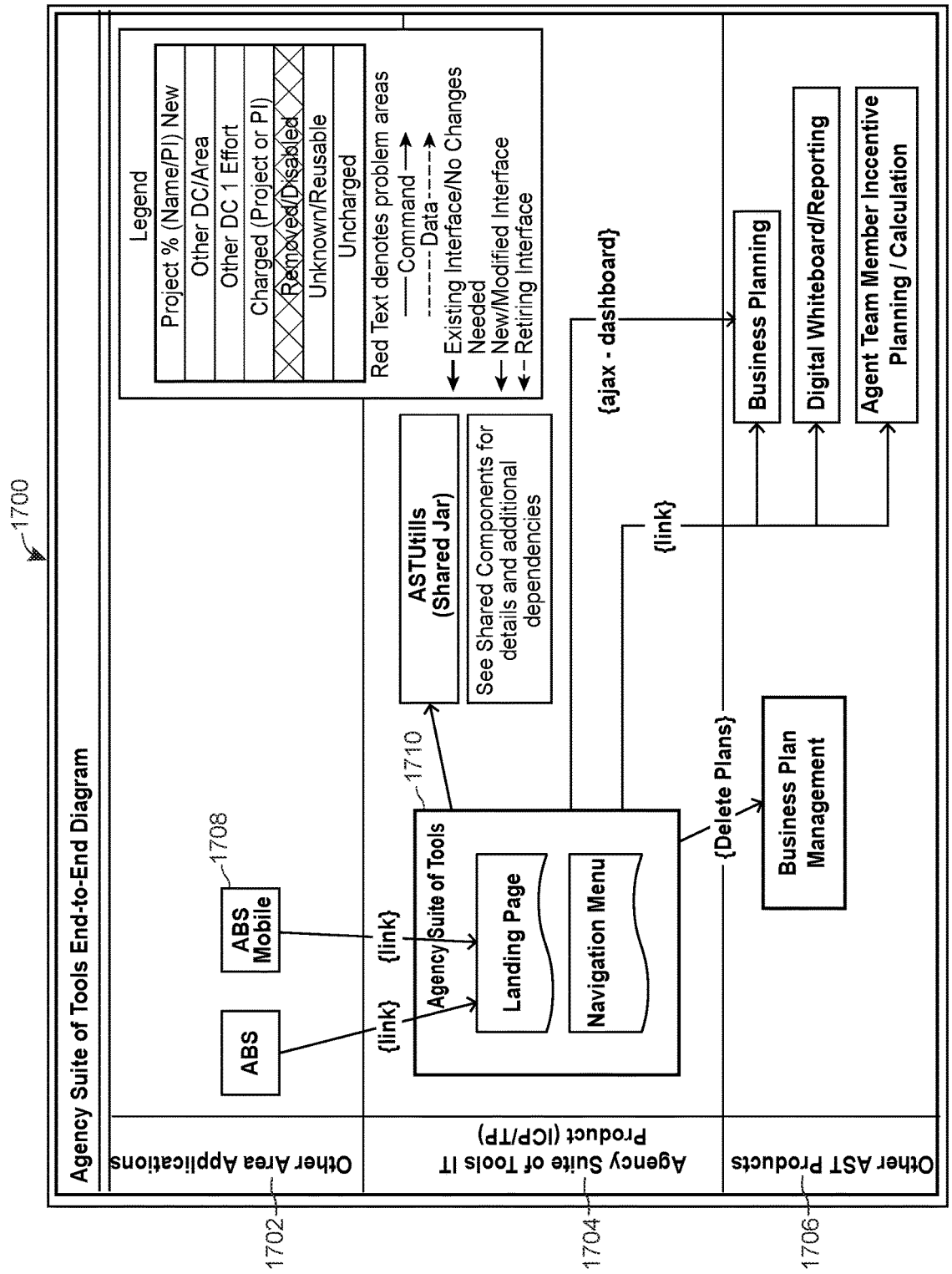
FIG. 17 illustrates a first embodiment of an end-to-end flow diagram associated with the big-data view integration platform of FIG. 1 in accordance with various embodiments disclosed herein.

FIG. 17 illustrates a first embodiment of an end-to-end flow diagram 1700 associated with the big-data view integration platform of FIG. 1 in accordance with various embodiments disclosed herein. End-to-end flow diagram 1700 illustrates the flexibility and interoperability with various platform services, including, for example "other" application area applications 1702 (such as mobile application 1708). Mobile application 1708 may access the big-data view integration platform (shown as Agency Suite of Tools platform 1710 or API layer 1704 of FIG. 17) via a RESTful API as described herein (although other access methods are also contemplated as described herein).

The big-data view integration platform 1710 may access the other AST products 1706 via a variety of communication protocols (e.g., including legacy communication protocols) to retrieve, or receive, push-based, pull-based, and/or queue based information for integration and/or GUI generation as described herein. Communication protocols and data formats may include, for example, AJAX based communication for rendering GUIs (e.g., landing page and/or navigation menus) of the big-data view integration platform 1710, each of which may be associated with business planning GUIs, digital whiteboard GUIs, reporting GUIs, etc., as described herein.

Figure 18:
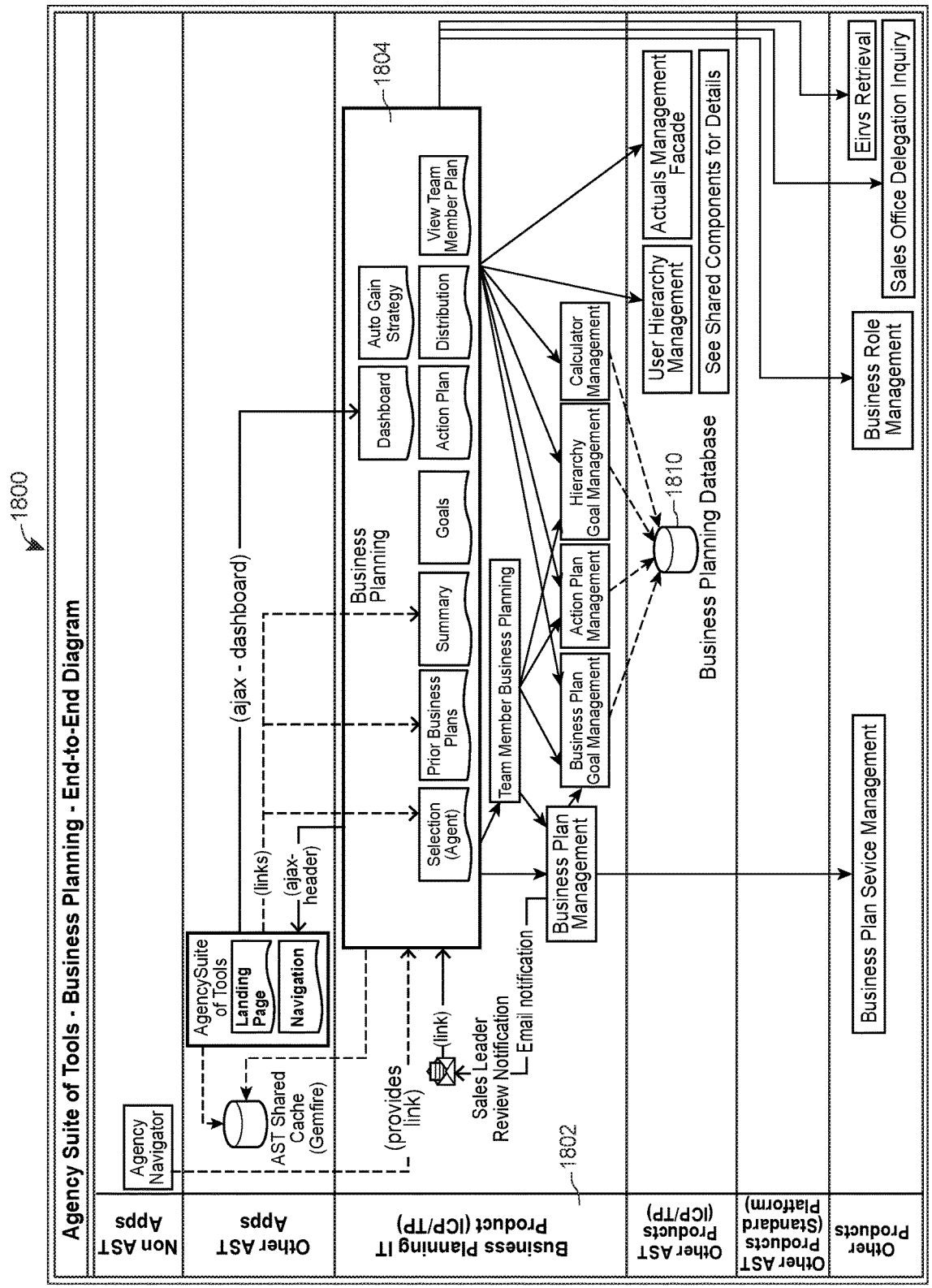
FIG. 18 illustrates a second embodiment of an end-to-end flow diagram associated with the big-data view integration platform of FIG. 1 in accordance with various embodiments disclosed herein.

FIG. 18 illustrates a second embodiment of an end-to-end flow diagram 1800 associated with the big-data view integration platform of FIG. 1 in accordance with various embodiments disclosed herein. In particular, end-to-end flow diagram 1800 illustrates a business planning based embodiment for implementation of business planning features as described herein. As illustrated by end-to-end flow diagram 1800, business planning data, as received from various push-based, pull-based, and/or queue based data services, may be coalesced in database 1810. Such data may be used to generate various integration GUIs 1804 (e.g., dashboard GUIs, auto gain strategy GUIs, selection GUI, summary GUIs, goal GUIs, action plan GUIs, etc.) associated with business planning as described herein, and which are distributed as part of the business planning component 1802 of the big-data view integration platform.

Figure 19:
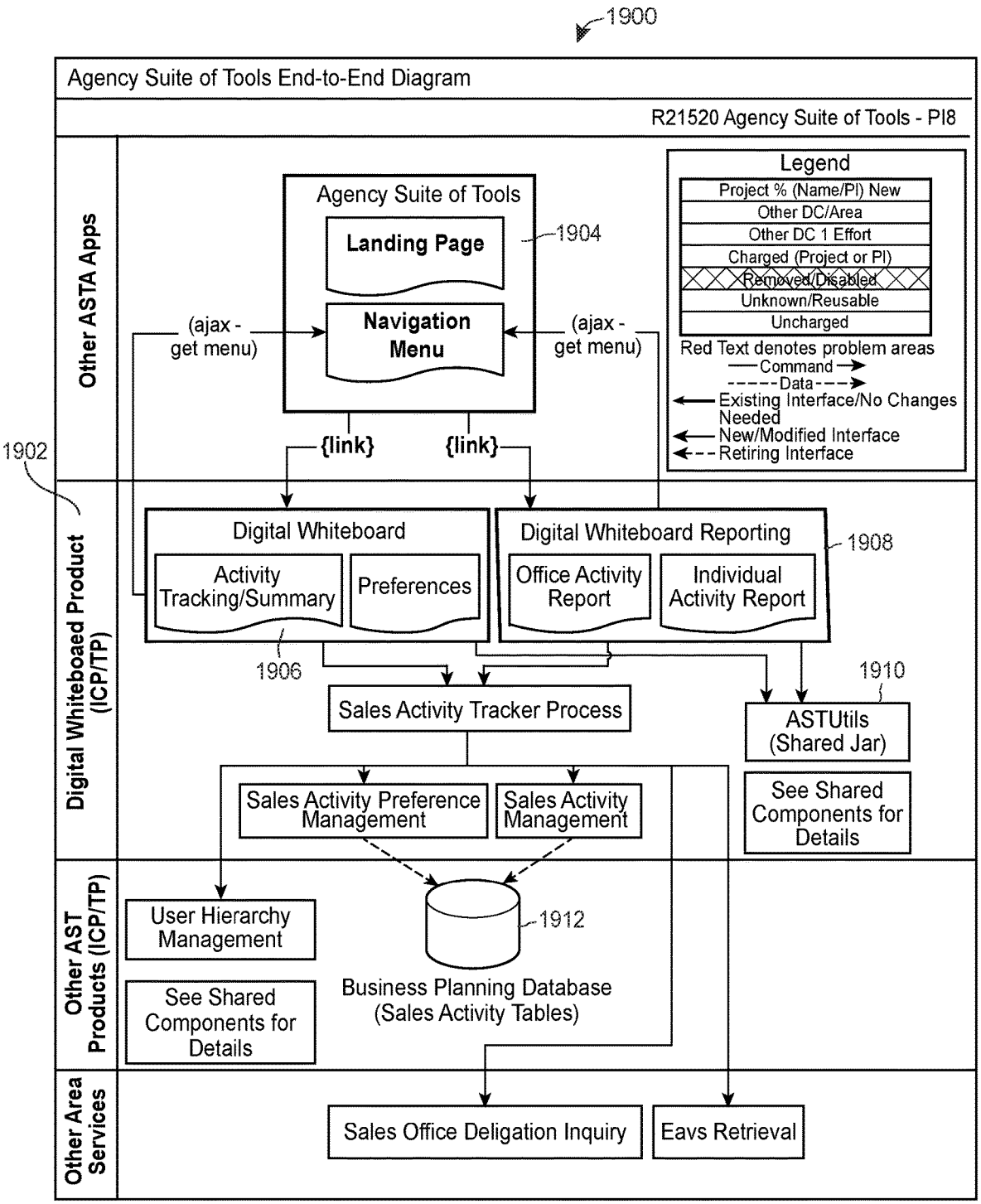
FIG. 19 illustrates a third embodiment of an end-to-end flow diagram associated with the big-data view integration platform of FIG. 1 in accordance with various embodiments disclosed herein.

FIG. 19 illustrates a third embodiment of an end-to-end flow diagram 1900 associated with the big-data view integration platform of FIG. 1 in accordance with various embodiments disclosed herein. In particular, end-to-end flow diagram 1900 illustrates an embodiment related to digital whiteboards as described digital herein. As shown in the example embodiment of end-to-end flow diagram 1900, whiteboard layer 1902 of the data view integration platform may include digital whiteboard component 1906 and digital whiteboard reporting component 1908 that are configured to be in client-server communication with application layer 1904 for the generation of webpages, e.g., landing page, navigation menu, etc. Digital whiteboard component 1906 and digital whiteboard reporting component 1908 may further be configured to be in asynchronous communication (e.g., via AJAX) to render or update certain portions of the webpages (e.g., menus, etc.). Such updates may be based on data as received from various push-based, pull-based, and/or queue based data services, and may be coalesced in database 1912. Additionally, or alternatively, the whiteboard layer 1902 (e.g., including digital whiteboard component 1906 and digital whiteboard reporting component 1908) may access core or utility services, e.g., via ASTUtils 1910, which be implemented as a shared Java Archive (JAR) file, for example, as described herein for FIG. 16.

Figure 20:
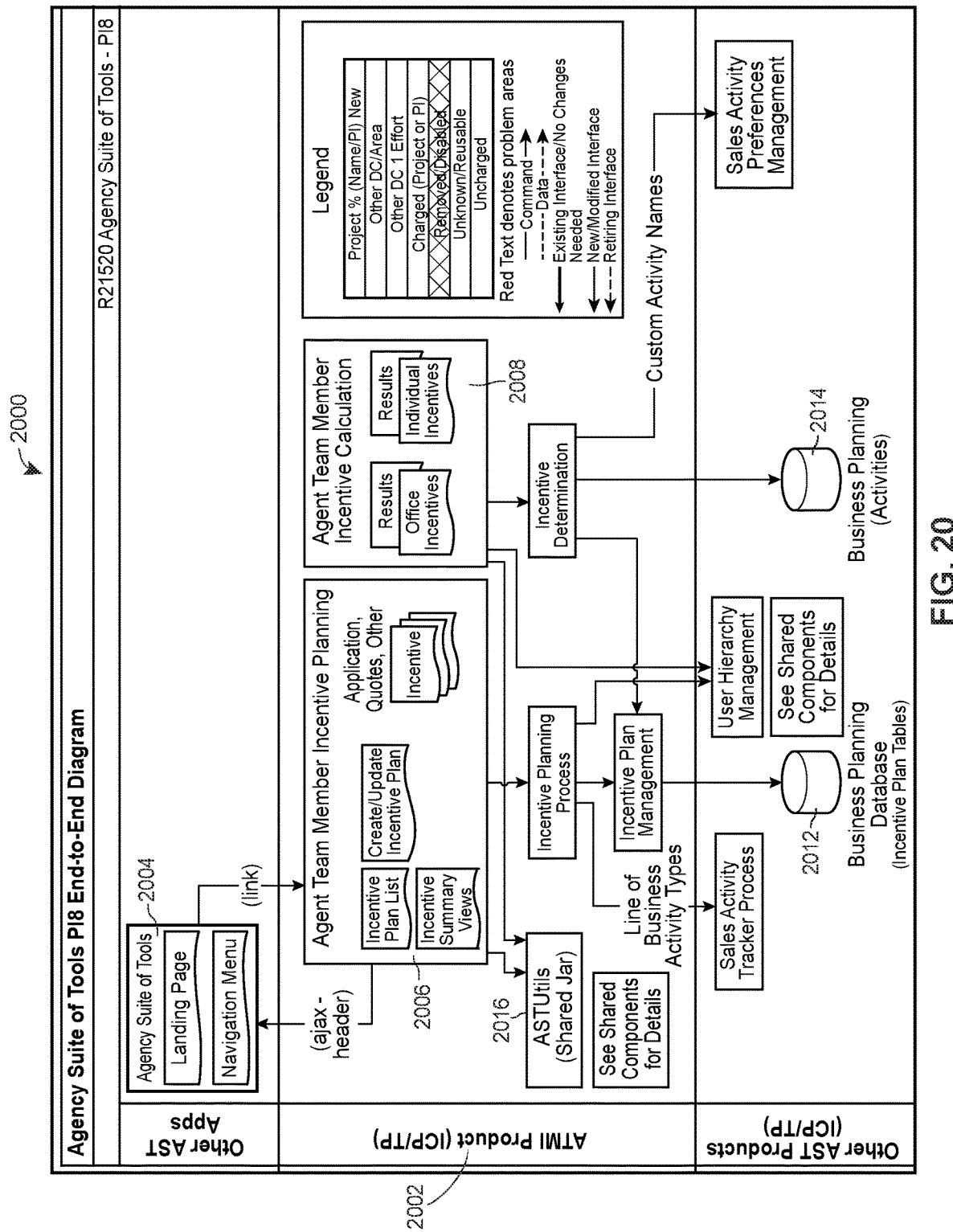
FIG. 20 illustrates a fourth embodiment of an end-to-end flow diagram associated with the big-data view integration platform of FIG. 1 in accordance with various embodiments disclosed herein.

FIG. 20 illustrates a fourth embodiment of an end-to-end flow diagram 2000 associated with the big-data view integration platform of FIG. 1 in accordance with various embodiments disclosed herein. In particular, end-to-end flow diagram 200 illustrates an embodiment related to incentives as described digital herein. As shown in the example embodiment of end-to-end flow diagram 2000, incentive layer 2002 of the data view integration platform may include agent team member incentive planning component 2006 and agent team member incentive calculation component 2008 that are configured to be in client-server communication with application layer 2004 for the generation of webpages, e.g., landing page, navigation menu, etc. Agent team member incentive planning component 2006 and agent team member incentive calculation component 2008 may further be configured to be in asynchronous communication (e.g., via AJAX) to render or update certain portions of the webpages (e.g., menus, etc.). Such updates may be based on data as received from various push-based, pull-based, and/or queue based data services, and may be coalesced in databases 2012 and/or 2014. Additionally, or alternatively, the 2002 incentive layer 2002 (e.g., including agent team member incentive planning component 2006 and agent team member incentive calculation component 2008) may access core or utility services, e.g., via ASTUtils 2016, which be implemented as a shared Java Archive (JAR) file, for example, as described herein for FIG. 16.

Figure 21:
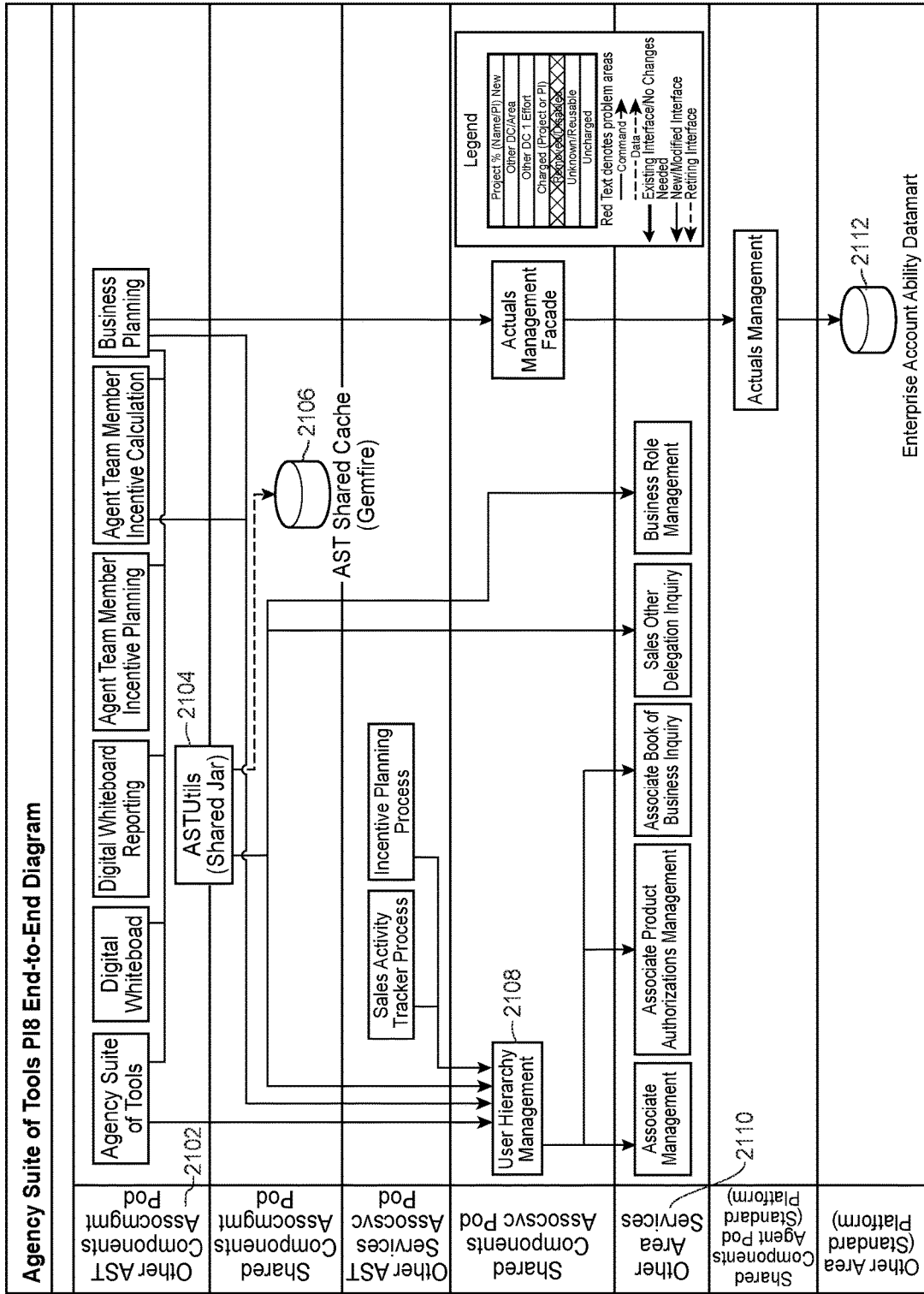
FIG. 21 illustrates a fifth embodiment of an end-to-end flow diagram associated with the big-data view integration platform of FIG. 1 in accordance with various embodiments disclosed herein.

FIG. 21 illustrates a fifth embodiment of an end-to-end flow diagram 2100 associated with the big-data view integration platform of FIG. 1 in accordance with various embodiments disclosed herein. In particular, end-to-end flow diagram 1900 illustrates an embodiment related to the big-data view integration platform connectivity and interoperability with other service areas. For example, components 2102 associated with big-data view integration platform (e.g., digital whiteboard views, incentive views, business planning views, etc.) may access a variety of other services 2210 including, for example, associate management services, associate product authorization management services, associate book of business inquiry services, etc. Such services may have, or otherwise be associated with, pull-based, push-based, and/or queue/event based data sourced from a variety of disparate entities, communications, or otherwise. In the embodiment of FIG. 21, components 2102 may access services 2210 directly or indirectly, e.g., such as via user hierarchy management component 2108. Components 2102 may also access core or utility services, e.g., via ASTUtils 2104, which may be implemented as a shared Java Archive (JAR) file, for example, as described herein for FIG. 16. For the generation of views, components 2102 may store pull-based, push-based, and/or queue/event based data in a cache 2106 for rapid rendering, visualization, or otherwise manipulation of such views (e.g., in real-time or near-real time as the pull-based, push-based, and/or queue/event based data is ingested into the big-data view integration platform).

Figure 22A:
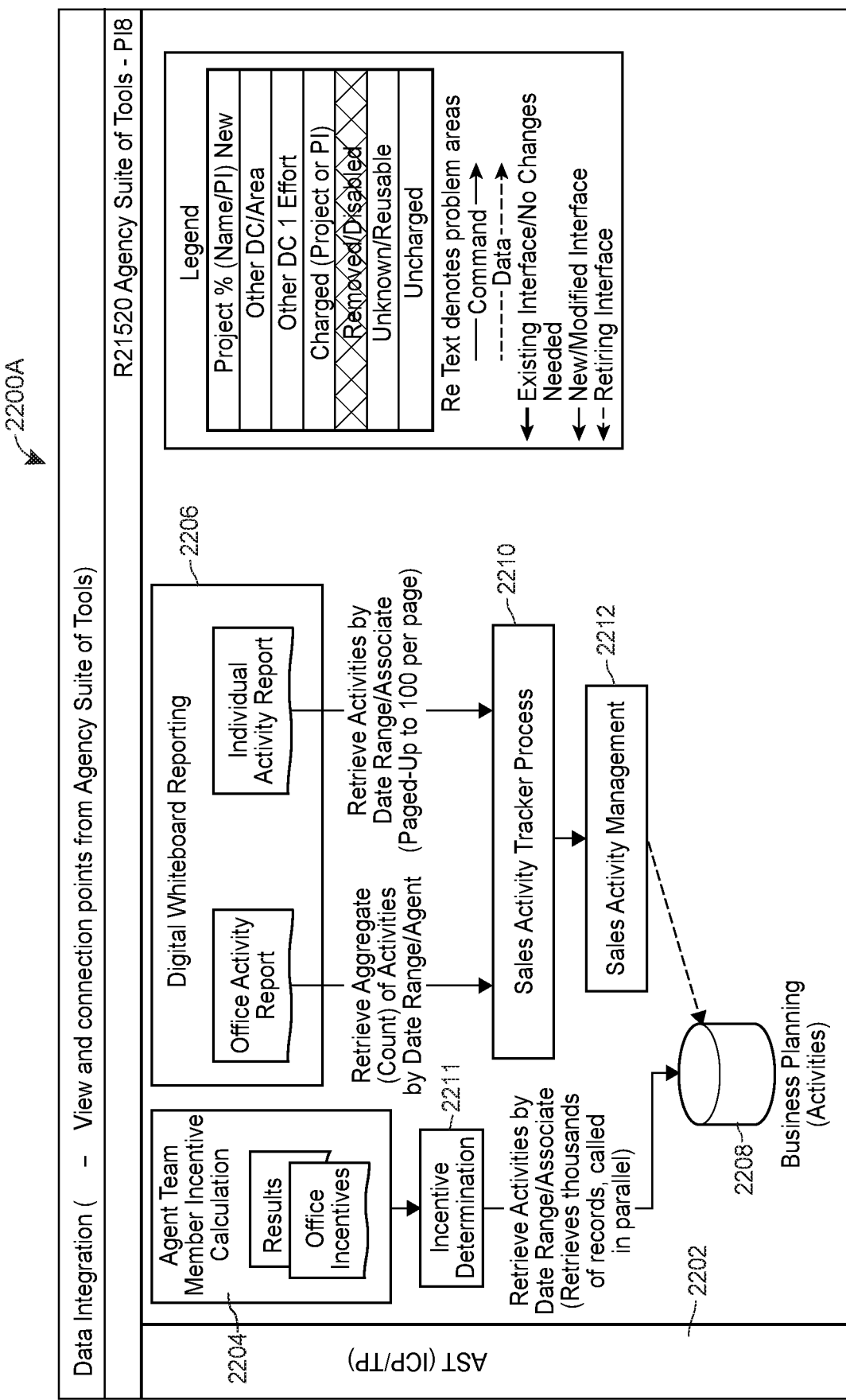
FIGS. 22A-C illustrate flow diagrams of example data integration embodiments associated with the big-data view integration platform of FIG. 1 in accordance with various embodiments disclosed herein.
Figure 22B:
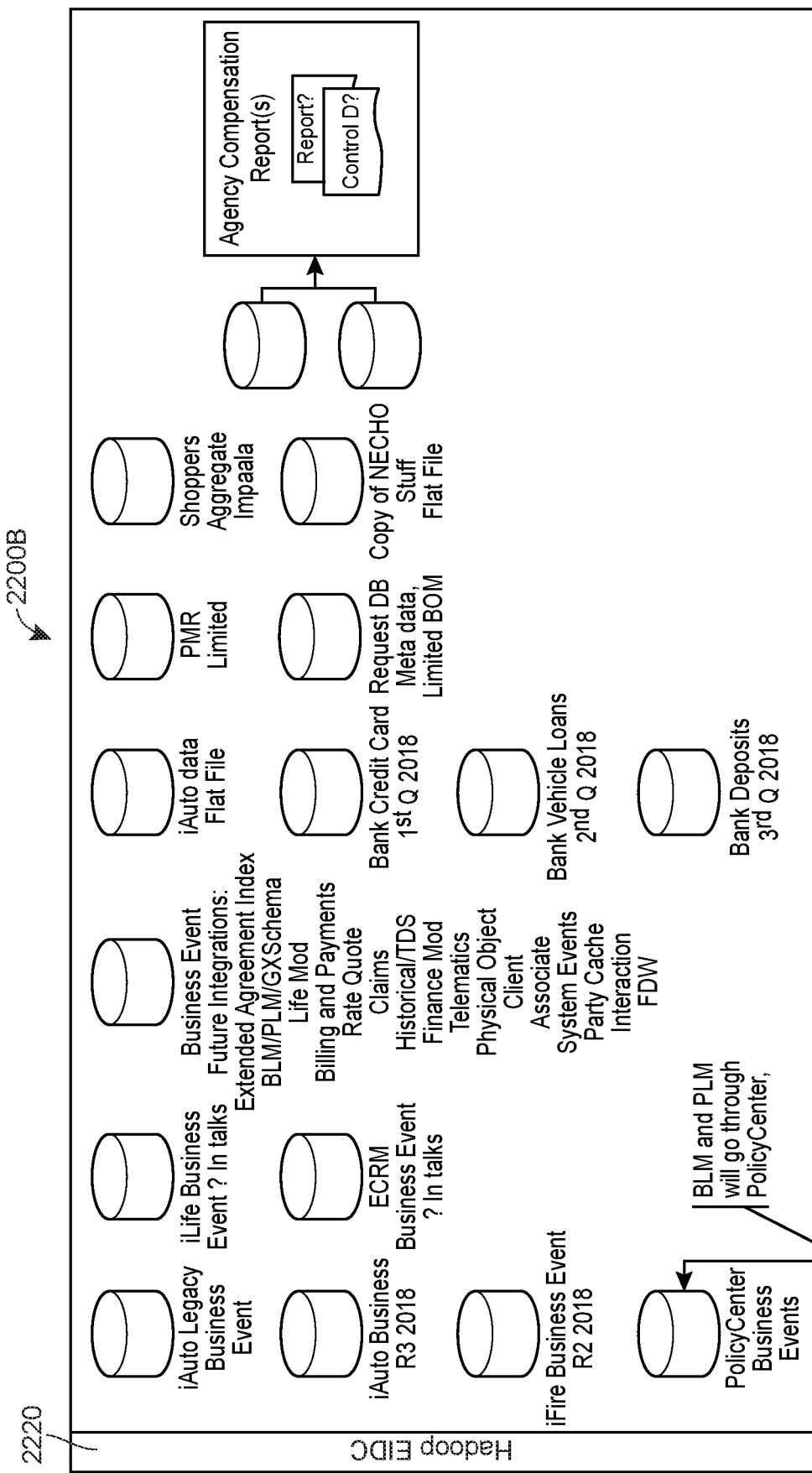
Figure 22C:
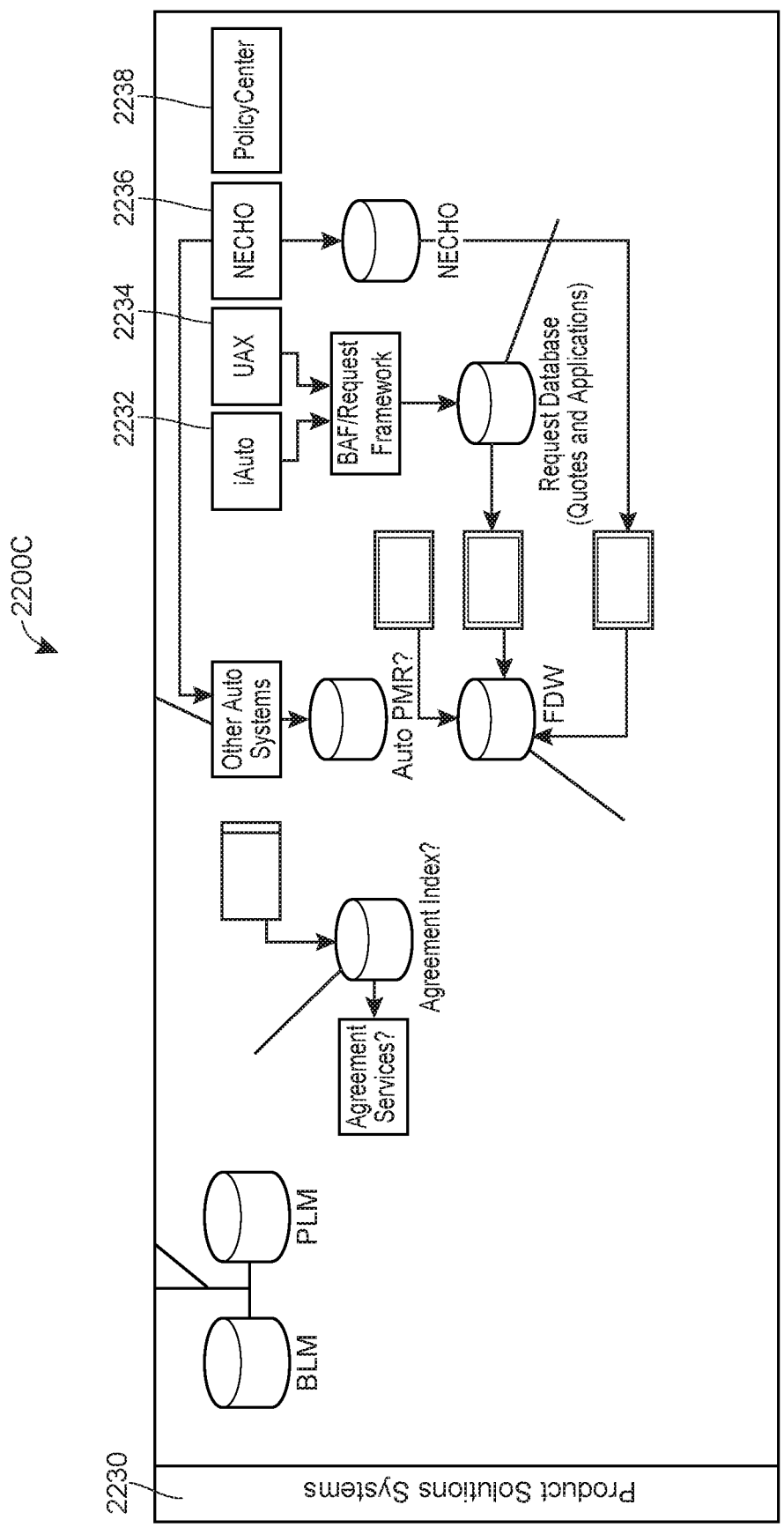

FIGS. 22A-C illustrate example flow diagrams 2200A-2200C of data integration embodiments associated with the big-data view integration platform of FIG. 1 in accordance with various embodiments disclosed herein. In particular, end-to-end flow diagrams 2200A-2200C illustrates an embodiment showing various view and connection points, for GUIs, views, and/or components as described herein. For example, as shown in FIG. 22A, agent team member incentive calculation view component 2102 and digital whiteboard reporting view component 2206 may be implemented as GUIs as part of AST layer 2202 that are connected via intermediary components (2210-2212) to activities database 2208. The data in activities database 2208 may include push, pull, and/or queue/event based data, and specifically push, pull, and/or queue/event based data related to activities as described herein.

AST layer 2202 may be connected to data layer 2220 of FIG. 22B. In various embodiments, data layer 2220 may be a based on, or include, Hadoop based processing (e.g., where data layer 2220 is entitled "Hadoop EIDC" in the embodiment of FIG. 22B). Hadoop provides a framework that allows for the distributed processing of large data sets across clusters of computers using simple programming models. Hadoop is designed to scale up from single servers to thousands of machines, each offering local computation and storage. Rather than relying on hardware to deliver high-availability, Hadoop detects and handle failures at the application layer, so as to deliver a highly-available service on top of a cluster of computers, each of which may be prone to failures. As shown in FIG. 22B, AST layer 2202 may include several databases and servers that store, receive, transmit, and manipulate push, pull, and/or queue/event based data using Hadoop. For example, such push, pull, and/or queue/event based data may exist across a variety of line of businesses and may have been sourced from a variety of platform services (e.g., legacy and/or non-legacy platform services) in various data formats as received a number of communication protocols that may be processed via Hadoop. Additionally, or alternately, the push, pull, and/or queue/event based of the databases data layer 2220 may be transformed (e.g., map-reduced) prior to, during, and/or after storage in the respective databases.

AST layer 2202 is communicatively coupled to back-end layer 2230, which, in the embodiment of FIG. 22C, includes various product solution systems. Back-end layer 2230 may include various legacies and non-legacy platform services 2232-2238. Back-end layer 2230, and its legacy and non-legacy platform services 2232-2238, may communicate to AST layer 2202 in a variety of different communication protocols and with a variety of different data formats.

Figure 23A:
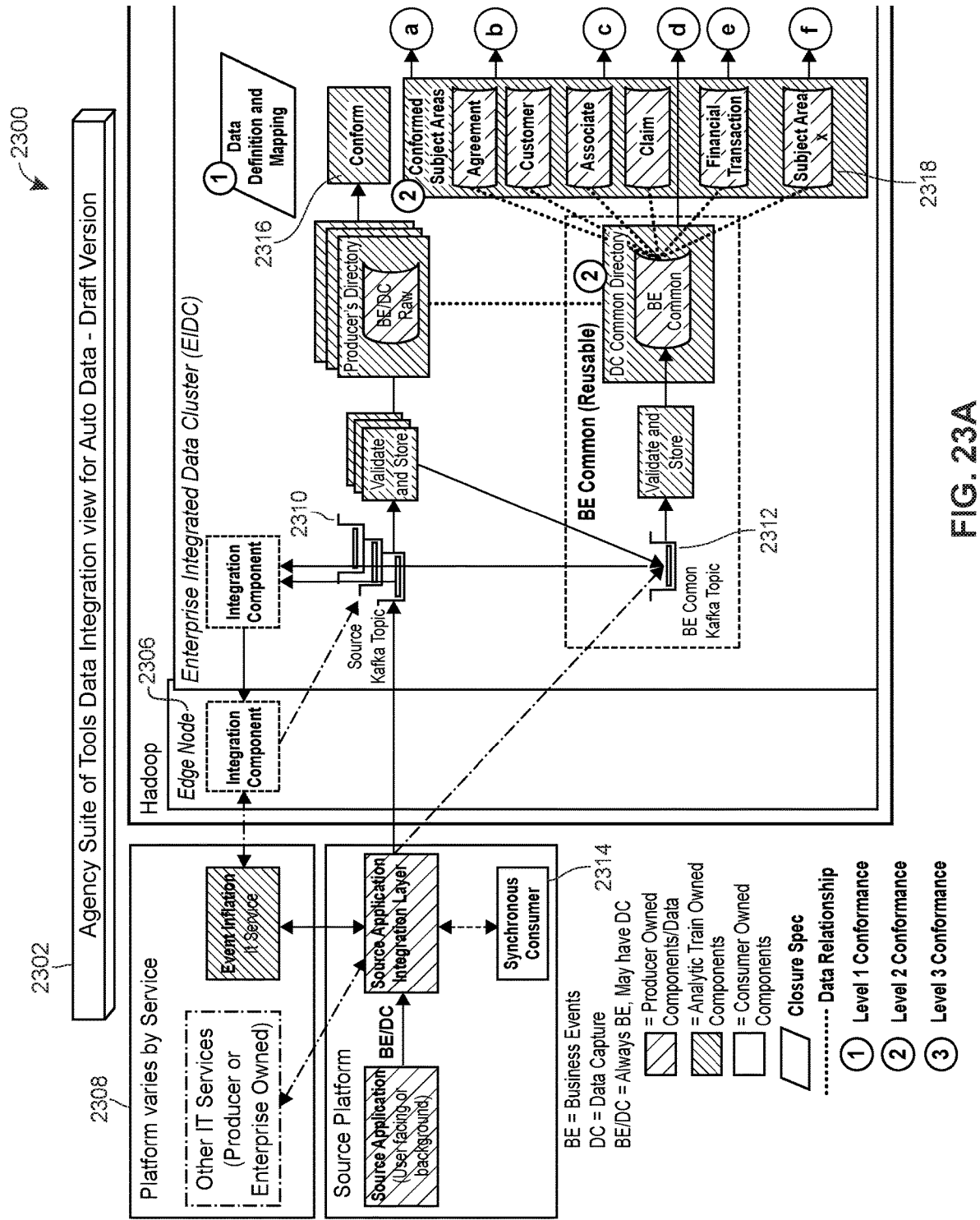
FIG. 23A and FIG. 23B illustrate a flow diagram illustrating an example data integration embodiment associated with the big-data view integration platform of FIG. 1 in accordance with various embodiments disclosed herein.
Figure 23B:
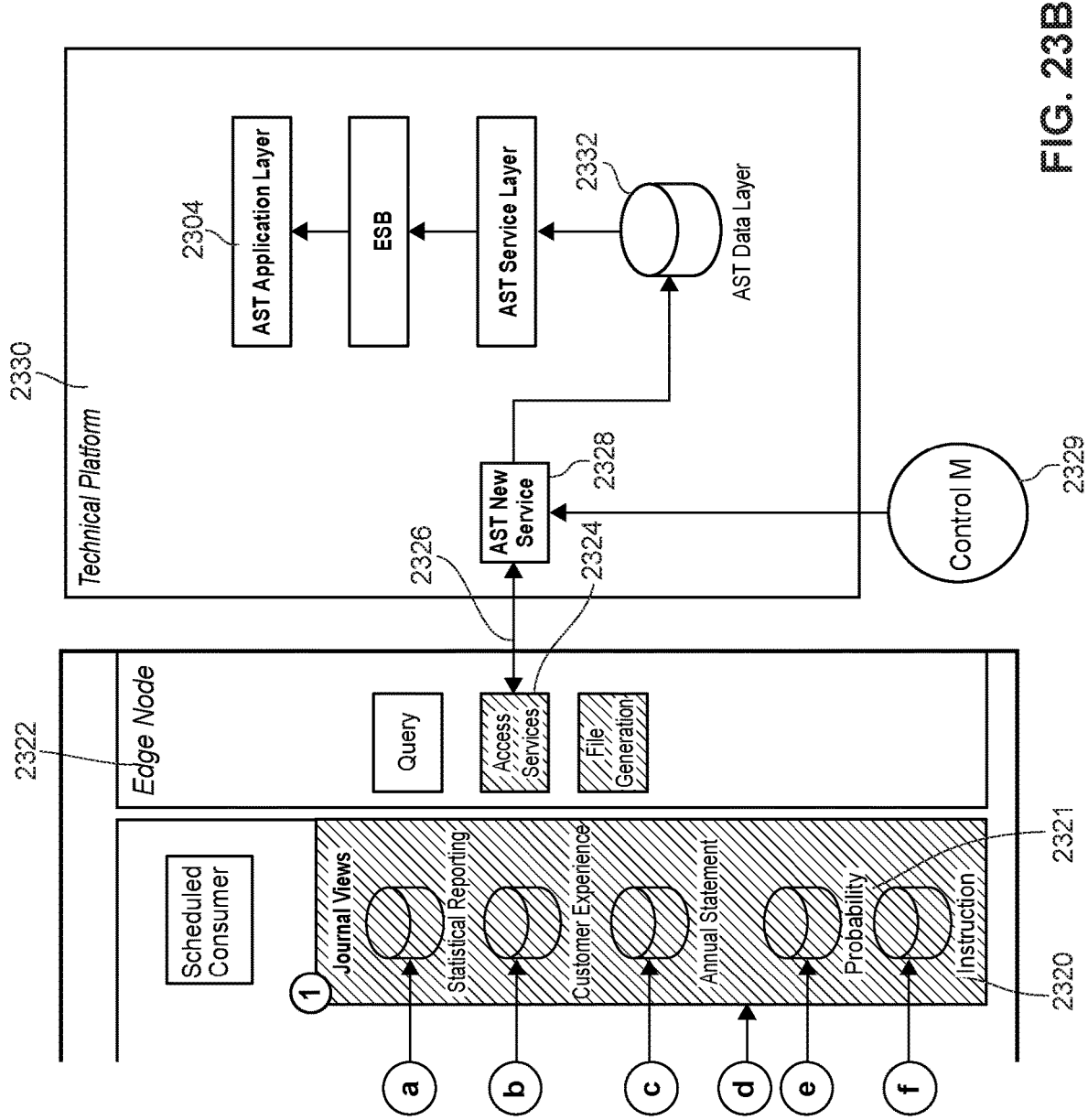

FIG. 23A and FIG. 23B illustrate a flow diagram 2300 illustrating an example data integration embodiment associated with the big-data view integration platform of FIG. 1 in accordance with various embodiments disclosed herein. As illustrated in the embodiment of diagram 2300, a big-data view integration platform 2302 may be configured to generate integration guided user interfaces (GUIs) that may be visualized at application layer 2304. The big-data view integration platform 2302 may include a first edge node 2306 configured to ingest push-based data and pull-based data from a plurality of platform services 2308. In some embodiments, at least one of the plurality of platform services 2308 may be a legacy platform service. Legacy platform services may, for example, use a first communication protocol (e.g., a legacy protocol such as CORBA, RMI, etc.). As used herein, the term "protocol" refers to a communication protocol or standard used for data communications in computer networks.

For example, in some embodiments, platform services may include an event inflation or initiation service that pushes data into first edge node 2306, e.g., for ingestion by Hadoop. The event inflation or initiation service may be used to ingest legacy or non-legacy data into the first edge node 2306.

Alternatively, or additionally, in some embodiments the push-based, pull-based data, and/or event data may be structured and/or unstructured data. For example, structured data may include relational data, such as data derivable or stored in a relational database such as IBM's DB2, PostgreSQL, ORALCLE, or the like. Unstructured data may include extensible markup language (XML), JavaScript object notation (JSON), or other flexible data structures, metadata, or the like that may be used with flexible client-server or interfaces libraries such as React, jQuery, or other similar interfaces.

The big-data view integration platform 2302 may further include an event-based queue (e.g., queues 2310 and 2312) configured to receive a plurality of queue events. In some embodiments, a first set of queue events (e.g., received at queue 2310) may include indirect push-based data as received from the first edge node 2306. In further embodiments, a second set of queue events (e.g., received at queue 2312) may include direct push-based data as received directly from a non-legacy platform service (e.g., source platform 2314). In various embodiments, the non-legacy platform service uses a second communication protocol that is incompatible with the first communication protocol.

Source platforms may include cloud-based platforms or other platforms internal or external to the computer network of the big-data view integration platform 2302. Source platforms may be deployed on web application servers or use online tools (e.g., Guide Wire and/or Magesto). Source platforms may include Java Enterprise Edition (JEE) implementations where push-based, pull-based, and/or queue based data may be sent to Kafka topic queues for Hadoop implementation and/or processing as described herein.

The big-data view integration platform 2302 may further include a conformity component 2316 configured to integrate the push-based data, the pull-based data, and the plurality of queue events into integration data having an enhanced integration format (e.g., a JavaScript Object Notation (JSON) format and/or a table structure with correlated data, where such correlated data may be transformed such as map-reduced or configured in a way that is accessible via a unified format, protocol, or standard as used by the big-data view integration platform 2302). In such embodiments, the conformity component may be further configured to interoperate data received via the first communication protocol and the second communication protocol via the enhanced integration format. In some embodiments, the integration data may be filtered into a plurality of subject types 2318, that may pertain to the subject areas of the data as received by the big-data view integration platform, e.g., agreement, customer, associate, claim, financial transaction subject areas.

The big-data view integration platform 2302 may further include a view integration component 2320 configured to generate a plurality of data views 2321 from the integration data and the plurality of subject types. Data views 2321 may be stored in permanent storage (e.g., ROM-based, using e.g., Hive) or temporary storage (RAM-based, using e.g., Impala) to create data structures and/or tables that represent views for access by APIs as described herein. With respect to the data info into data views 2321, a business events (BE) common queue (e.g., queue 2312) may queue events pushed or pulled from many/multiple activities (e.g., meetings, calls, information input by digital whiteboards, GUIs, etc., as described herein). As described herein, such queue data may be used to generate analytical insight via integration GUIs. Additional, or alternatively, a producers directory queue (e.g., queue 2310) may include information generally needed for the generation of data views 2321. Such data is generally, but not necessarily, pushed from platform services, etc. for the generation of data views 2321.

The big-data view integration platform 2302 may further include a second edge node 2322 exposing the plurality of data views 2321 via an access services API. The access services API may be implemented as a representational state transfer API. In addition, the access services API may be accessible via a computer network 2326.

The big-data view integration platform 2302 may further include a new service execution component 2328 configured to access the access services API 2324 via the computer network 2326. In some embodiments, new service execution component 2328 may access services API 2324 in batch intervals. Batch intervals, including the frequency and amount of such batches, may be configured via control component (control M) 2329. Alternatively, or additionally, control component (control M) 2339 may be configured to cause new service execution component 2328 to access services API 2324 in real time or in near real time.

Each access to the access service API (e.g., each batch interval access or real time/near real time access) may include the new service execution component 2328 that generates an integration GUI based on the data views 2321 as accessed from the access services API 2324. In some embodiments, the integration GUI may be configured to be provided to an application layer 2304 of a technical end-user platform 2330. The technical end-user platform 2330 may be a Tomcat server based platform for rendering and/or visualization of integration GUIs as described herein. In some embodiments, technical end-user platform 2330 may be an internal platform, such as a private network of servers behind firewall(s), DMZ network or component, or other network boundary. Alternatively, or additionally, the technical end-user platform 2330 may be a cloud based platform, accessible via a client (e.g., mobile app or webpage) designed to interface with the cloud based platform.

Application layer 2304 may access database 2332 for the integration data as batched into database 2332 by the new service execution component 2328. In this way, database 2332 provides information for application layer 2304 to render, which may include rendering integration GUIs associated with digital whiteboard, business planning, reporting, incentives, etc. as described herein.

The integration GUIs may include at least a portion of the integration data, e.g., including at least one of: (1) legacy data from the legacy platform and non-legacy data from the non-legacy platform (e.g., 2308 and/or 2314); and/or (2) a portion of the push-based data, a portion of the pull-based data, and a portion of data from at least one queue event of the plurality of queue events (e.g., 2312 and/or 2310).

Figure 24:
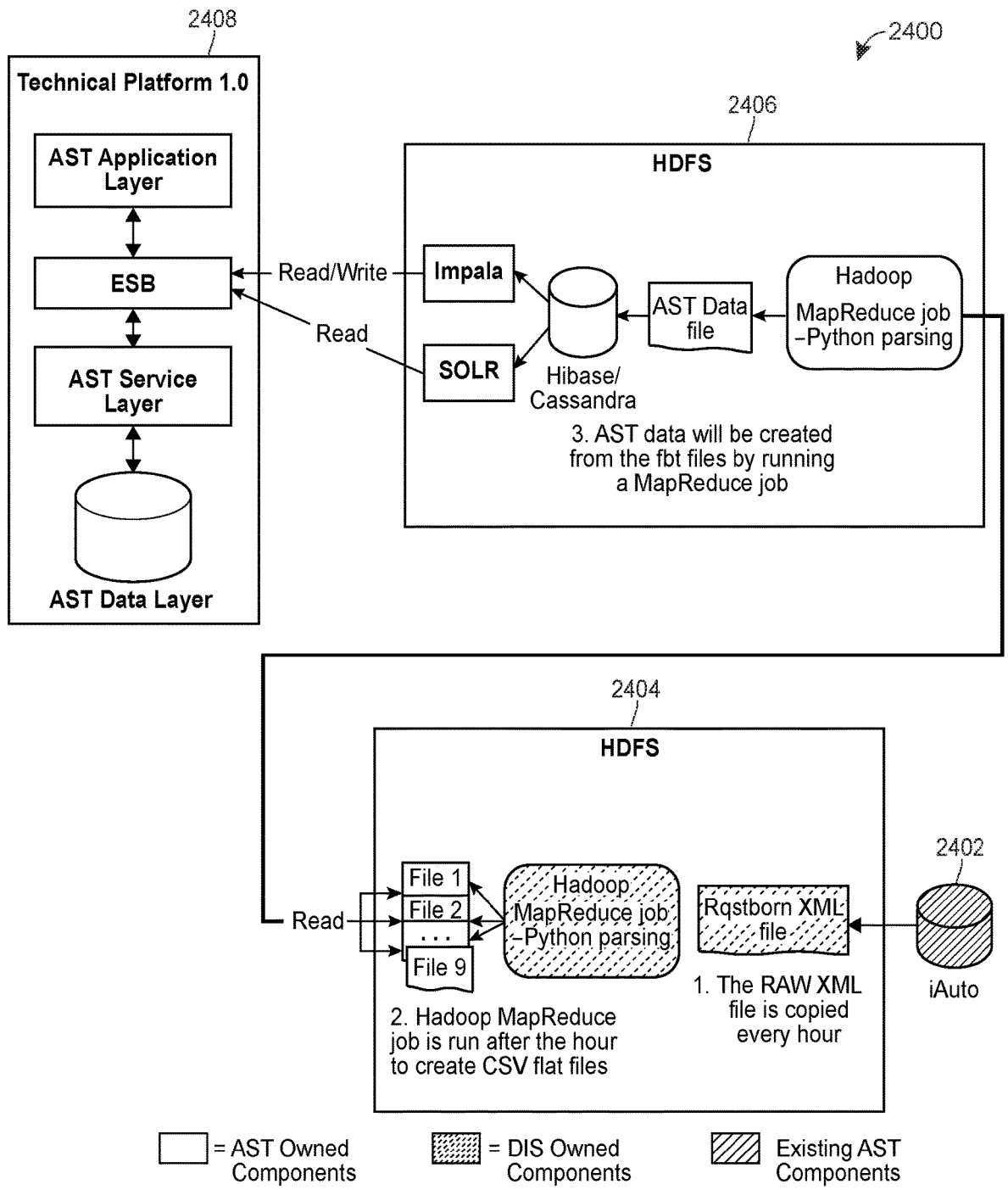
FIG. 24 illustrates a flow diagram illustrating a second example data integration embodiment associated with the big-data view integration platform of FIG. 1 in accordance with various embodiments disclosed herein.

FIG. 24 illustrates a flow diagram 2400 illustrating a second example data integration embodiment associated with the big-data view integration platform of FIG. 1 in accordance with various embodiments disclosed herein. In particular, flow diagram 2400 illustrates an embodiment related to ingesting data from a particular platform service (e.g., "iAuto") and transforming that data (e.g., via map-reduce of Hadoop) as described herein. Technical end-user platform 2408 and database 2402 of FIG. 24 may correspond to technical end-user platform 2330 and database 2332 of FIGS. 23A and 23B, respectively. As illustrated in FIG. 24, data (in the form of an XML file in the embodiment of FIG. 24) flows from database 2402 to map-reduce component 2404, where it is map-reduced to various sub files. The sub files are then read by data integration component 2406, which parses the sub files and generates (e.g., by a further map-reduce procedures) business planning, reporting, digital whiteboard, incentive, or other specific data for data views (e.g., data views 2321) and/or integration GUIs as described herein. Such, data views and/or integration GUIs may be rendered via technical end-user platform 2408 in a same or similar process as described herein for FIGS. 23A and 23B.

Figure 25:
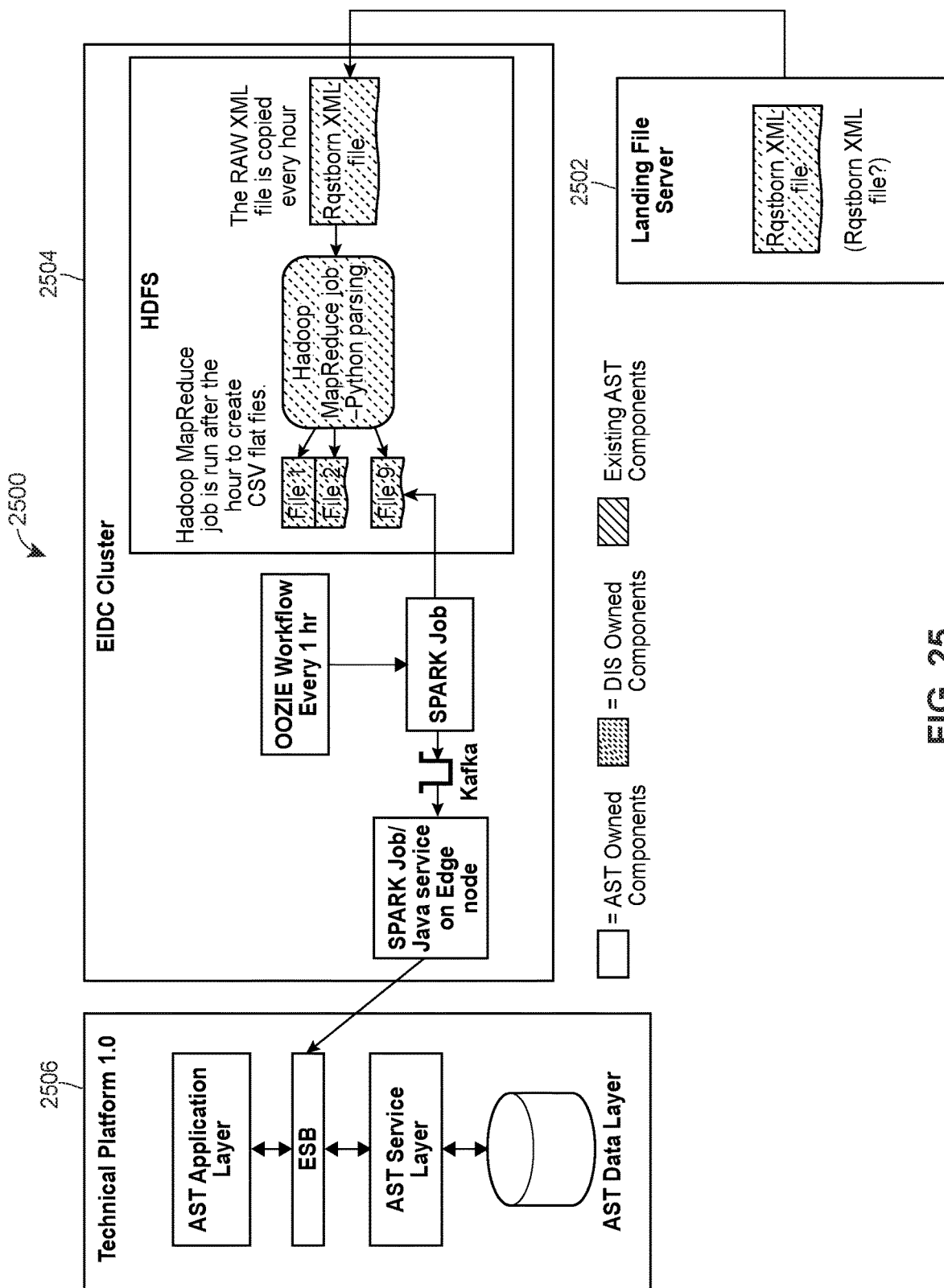
FIG. 25 illustrates a flow diagram illustrating a third example data integration embodiment associated with the big-data view integration platform of FIG. 1 in accordance with various embodiments disclosed herein.

FIG. 25 illustrates a flow diagram 2500 illustrating an third example data integration embodiment associated with the big-data view integration platform of FIG. 1 in accordance with various embodiments disclosed herein. In particular, flow diagram 2500 illustrates an embodiment related to ingesting data from a particular platform service (e.g., a landing file server 2502 receiving XML files) and transforming that data (e.g., via map-reduce on Hadoop) as described herein. In the embodiment of FIG. 25, batch intervals are used. Such batch intervals may the same as described herein for new service execution component 2328 of FIGS. 23A and 23B. Technical end-user platform 2506 and database 2502 of FIG. 25 may correspond to technical end-user platform 2330 and database 2332 of FIGS. 23A and 23B, respectively. As illustrated in FIG. 25, data (in the form of an XML file in the embodiment of FIG. 24) flows from landing file server 2502 to cluster component 2504, where the data is map-reduced to various sub files, which are then used to generate business planning, reporting, digital whiteboard, incentive, or other specific data for data views (e.g., data views 2321) and/or integration GUIs as described herein. In some embodiments, cluster component 2504 may be implemented on a cloud-based platform or a platform as a service (PaaS). Further, in some embodiments, the XML file is a Rqstborn (e.g., push based) XML file that includes information such as daytime stamp, agent (e.g., name, etc.) customer (e.g., name, etc.), activity type (e.g., follow-up call, quote, etc.) associated with the business planning, reporting, digital whiteboard, incentive, or other specific data.

In the embodiment of FIG. 25, batch intervals are run every once an hour, such that the data views (e.g., data views 2321) and/or integration GUIs are queued for access (e.g., via access services API 2324 as described for FIGS. 23A and 23B), which are illustrated in FIG. 25 exposed via a service/job on the second edge node (e.g., corresponding to second edge node 2322). Such, data views and/or integration GUIs may be rendered via technical end-user platform 2506 in a same or similar process as described herein for FIGS. 23A and 23B.

Figure 26:
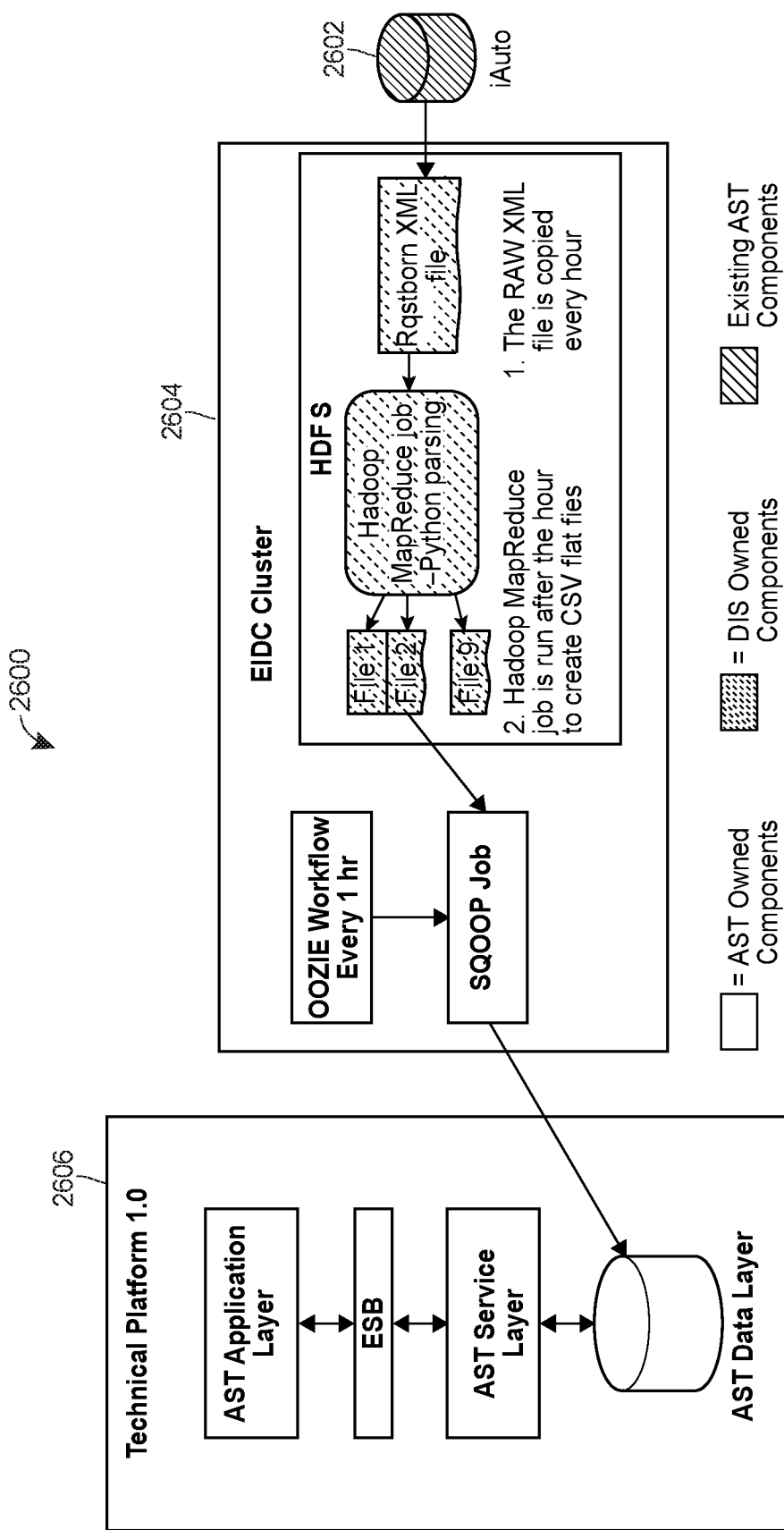
FIG. 26 illustrates a flow diagram illustrating a fourth example data integration embodiment associated with the big-data view integration platform of FIG. 1 in accordance with various embodiments disclosed herein.

FIG. 26 illustrates a flow diagram 2600 illustrating an fourth example data integration embodiment associated with the big-data view integration platform of FIG. 1 in accordance with various embodiments disclosed herein. In particular, flow diagram 2600 illustrates an embodiment related to ingesting data from a particular platform service (e.g., "iAuto") and transforming that data (e.g., via map-reduce of Hadoop) as described herein. In the embodiment of FIG. 26, batch intervals are used. Such batch intervals may the same as described herein for new service execution component 2328 of FIGS. 23A and 23B. Technical end-user platform 2606 and database 2602 of FIG. 25 may correspond to technical end-user platform 2330 and database 2332 of FIGS. 23A and 23B, respectively. As illustrated in FIG. 26, data (in the form of an XML file in the embodiment of FIG. 26) flows from database 2602 cluster component 2604, where it is map-reduced to various sub files. Such sub files are then used to generate business planning, reporting, digital whiteboard, incentive, or other specific data for data views (e.g., data views 2321) and/or integration GUIs as described herein. In some embodiments, cluster component 2604 may be implemented on a cloud-based platform or a platform as a service (PaaS). Further, in some embodiments, the XML file is a Rqstborn (e.g., push based) XML file that includes information such as daytime stamp, agent (name, etc.) customer (name, etc.), activity type (follow-up call, quote, etc.) associated with the business planning, reporting, digital whiteboard, incentive, or other specific data.

In the embodiment of FIG. 26, batch intervals are run once an hour, such that the data views (e.g., data views 2321) and/or integration GUIs are queued for access (e.g., via access services API 2324 as described for FIGS. 23A and 23B), which are illustrated in FIG. 26 as exposed via a service/job (e.g., corresponding to second edge node 2322 for FIGS. 23A and 23B). Such data views and/or integration GUIs may be rendered via technical end-user platform 2606 in a same or similar process as described herein for FIGS. 23A and 23B.

Figure 27:
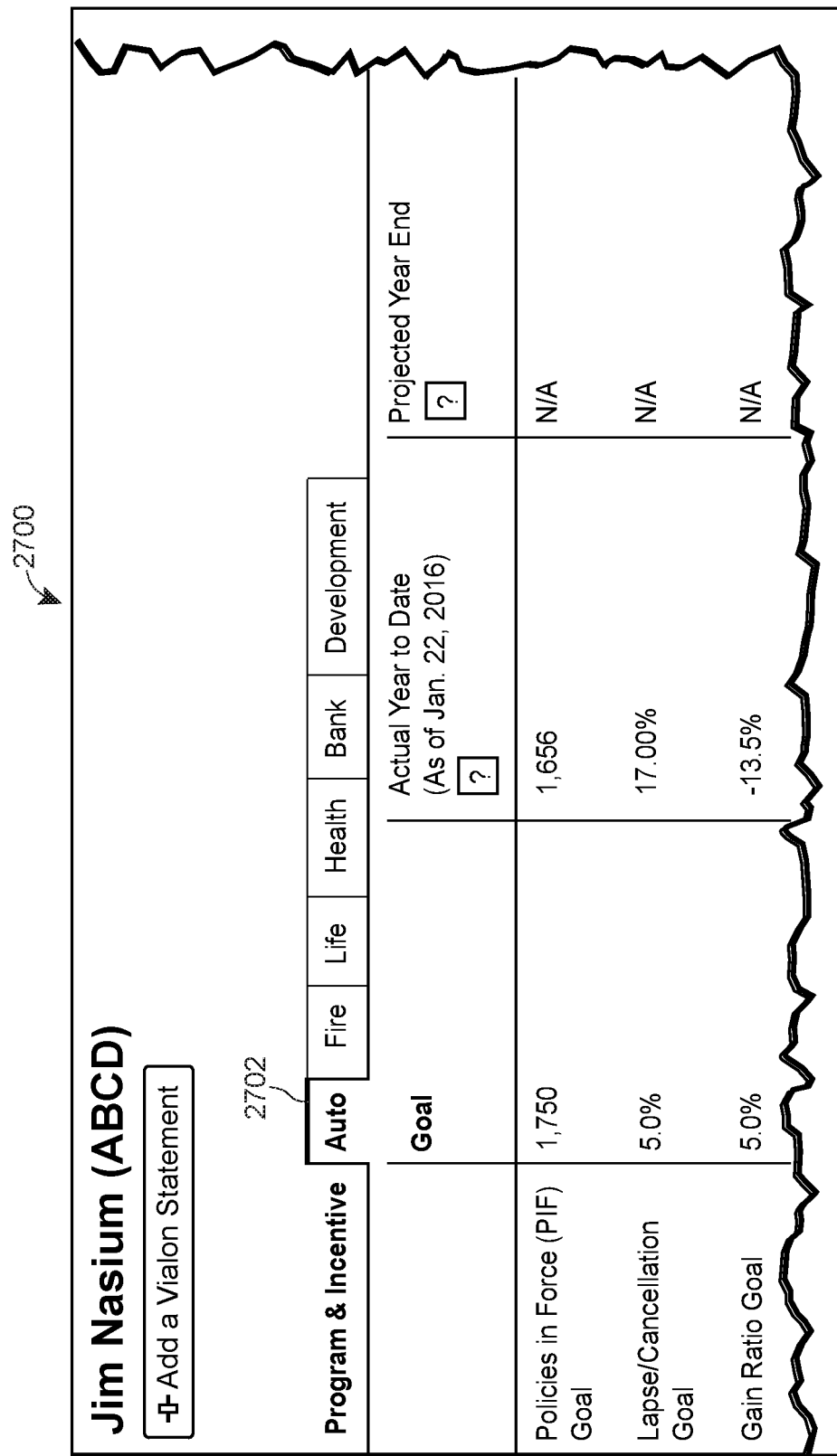
FIG. 27 illustrates an example of a first embodiment of an integration GUI that may be generated by the big-data view integration platform of FIG. 1 in accordance with various embodiments disclosed herein.
Figure 28:
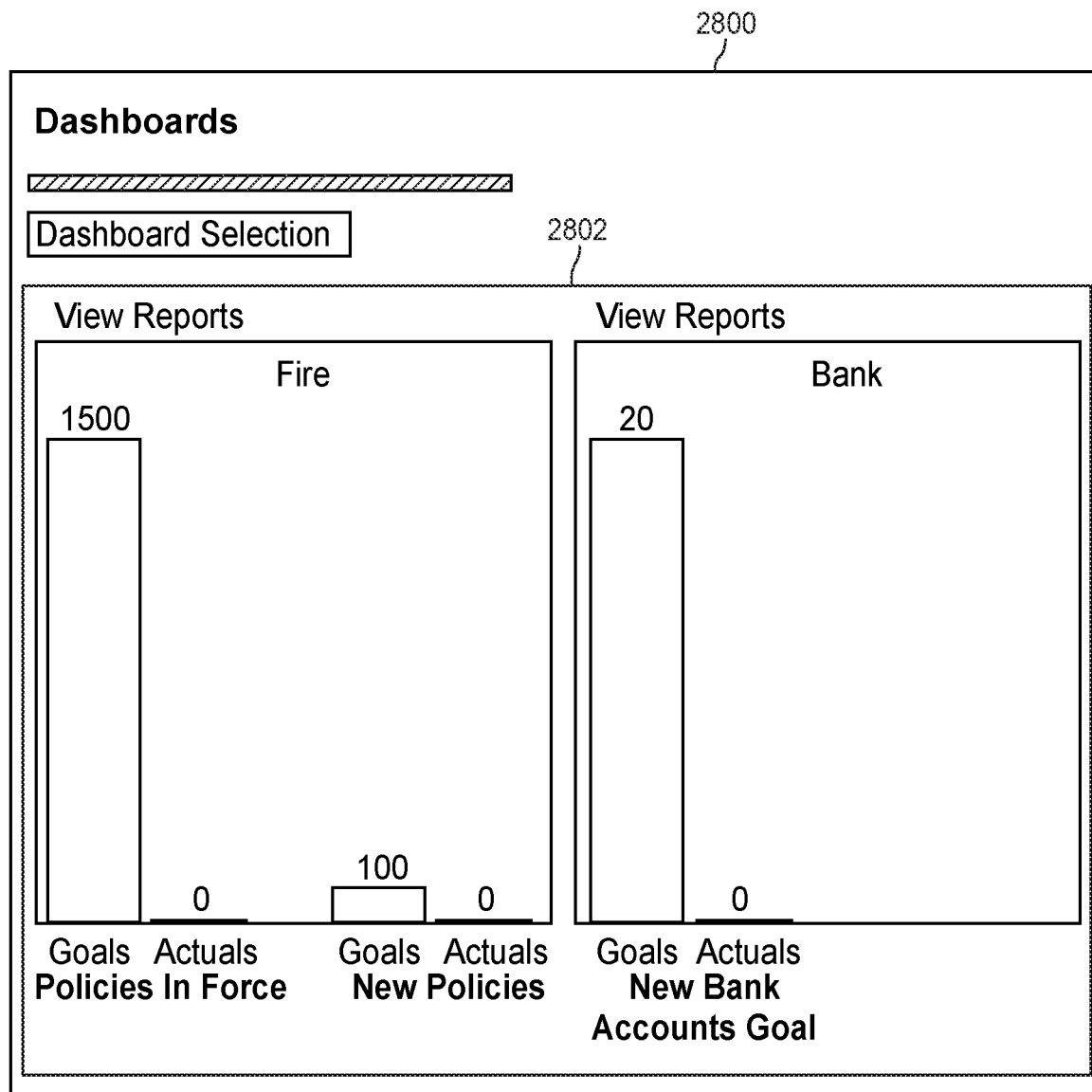
FIG. 28 illustrates an example of a second embodiment of an integration GUI that may be generated by the big-data view integration platform of FIG. 1 in accordance with various embodiments disclosed herein.

FIG. 27 illustrates an example of a first embodiment of an integration GUI 2700 that may be generated by the big-data view integration platform of FIG. 1 in accordance with various embodiments disclosed herein. Integration GUI 2700 includes various integration data as received from various platform services via push-based data, pull-based data, and/or queue-based data as described herein. The particular embodiment of integration GUI 2700 represents a goal based integration GUI in table format. If an electronic business plan is updated, the landing page may be refreshed (e.g., in real-time or near real time and/or in a batched time as described herein), rendering integration GUI 2700 and updating the goals data. An end-user (e.g., agent) may utilize the integrated data to manage the business plan, without having to access or rely on a plurality of other software platforms. Instead, the integration GUI 2700 provides the information within a single, unified environment. In some embodiments, the data within the table is updated in real-time, near real-time, or some other time period using the most recent data available for each line of business (e.g., auto, fire, etc.). As illustrated in FIG. 28, the tabs are dynamic and will only be available for view if there are assigned goals for the line of business.

FIG. 28 illustrates an example of a second embodiment of an integration GUI 2800 that may be generated by the big-data view integration platform of FIG. 1 in accordance with various embodiments disclosed herein. Integration GUI 2800 includes various integration data as received from various platform services via push-based data, pull-based data, and/or queue-based data as described herein. The particular embodiment of integration GUI 2800 represents a goal based integration GUI in a visual format. Therefore, integration GUI 2800 provides a visual interpretation of integration data. If an electronic business plan is updated, the landing page may be refreshed (e.g., in real-time or near real time and/or in a batched time as described herein), rendering integration GUI 2800 and updating the goals data.

An end-user (e.g., agent) may utilize the integrated data to manage the business plan, without having to access or rely on a plurality of other software platforms. Instead, the integration GUI 2800 provides the information within a single, unified environment. In some embodiments, the integration data of integration GUI 2800 is updated real-time, near real-time, or some other time period using the most recent data available for each line of business (e.g., auto, fire, etc.).

For each of the integration GUI embodiments (e.g., integration GUI 2700 and/or integration GUI 2800), such integration GUIs will be rendered, by default, for each line of business and for which a goal has been entered in the business plan. However, such views can be customized to only show the data wanted to be seen. Integration GUIs (e.g., integration GUI 2700 and integration GUI 2800) may be accessed from browser(s) (e.g., Google Chrome, Internet Explorer, etc.), a mobile device or other computing device (e.g., a laptop). In various embodiments, the integration GUIs will adjust to for a smaller screens, such as a mobile device, and/or larger screens such as a desktop with a larger viewing window.

ADDITIONAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A tangible, non-transitory computer-readable medium storing instructions for generating a guided user interface (GUI), that when executed by one or more processors of a computing device, cause the computing device to:

receive, at an edge node of a big-data view integration platform, push-based data, pull-based data, and queue-based data from a plurality of platform services in a pre-determined time interval;

integrate, by the edge node and using a map-reduce process, the push-based data, the pull-based data, and the queue-based data into integration data having an enhanced integration format, wherein the integrating includes:

map-reducing the push-based data, the pull-based data, and the queue-based data to a plurality of sub files associated with a plurality of subjects;

filtering the integration data, based at least in part on the plurality of sub files, into a plurality of data views corresponding to the plurality of subjects; and queuing the plurality of data views, according to the pre-determined time interval, in a database;

generate the GUI, the GUI including at least a first data view of the plurality of data views, and one or more selectable icons, each icon of the one or more selectable icons representing a respective incentive, wherein the GUI is configured to initiate a first asynchronous call via an application programming interface (API) to populate a first dynamic field with a second data view of the queued plurality of data views, the first dynamic field including a first icon of the one or more selectable icons representing a first incentive;

receive an update on the push-based data, the pull-based data, and the queue-based data associated with updated business plans of a plurality of business units, updated activities on the GUI, and updated user activities of users participating an incentive program;

update the queued plurality of data views in the database; and receive a first selection of the first incentive on the GUI causing the GUI to initiate a second asynchronous call via the API to populate the second dynamic field with a third data view of the queued plurality of data views, the third data view including information indicative of the updated business plan, the updated activities on the GUI, and the updated user activities of the users participating the incentive program, and the second dynamic filed including a second icon of the one or more selectable icons representing a second incentive.

2. The tangible, non-transitory computer-readable medium of claim 1, wherein the asynchronous call is an asynchronous JavaScript and extensible markup language (AJAX) based asynchronous call.

3. The tangible, non-transitory computer-readable medium of claim 1, wherein the GUI is configured to generate a third dynamic field based on a second selection of the second incentive on the GUI causing the GUI to initiate a third asynchronous call to populate the third dynamic field with a fourth data view of the queued plurality of data views, the fourth data view including information indicative of the updated activities on the GUI, and the updated user activities of the users participating the incentive program during the pre-determined time interval.

4. The tangible, non-transitory computer-readable medium of claim 1, wherein the GUI is dynamically generated.

5. The tangible, non-transitory computer-readable medium of claim 1, wherein the one or more selectable incentives icons are restricted to certain end users.

6. The tangible, non-transitory computer-readable medium of claim 1, wherein the GUI includes a visual interpretation of the integration data comprising at least one of:

comparisons of goals and actual results to the goals related to one or more users, accomplished activities of the one or more users, or business plans of a plurality of business units.

7. The tangible, non-transitory computer-readable medium of claim 1, wherein the computing device is further caused to:

receive the update on the push-based data, the pull-based data, and the queue-based data associated with updated business plans of a plurality of business units, updated activities on the GUI, and the updated user activities of users participating the incentive program in the pre-determined time interval;

update the queued plurality of data views in the database in the pre-determined time interval; and update the GUI in the pre-determined time interval.

8. The tangible, non-transitory computer-readable medium of claim 1, wherein the GUI is generated in real-time.

9. The tangible, non-transitory computer-readable medium of claim 1, wherein the GUI is generated in near real-time.

10. A big-data view integration method for generating a guided user interface (GUI), the big-data view integration method comprising:

receiving, at an edge node of a big-data view integration platform, push-based data, pull-based data, and queue-based data from a plurality of platform services;

integrating, by the edge node and using a map-reduce process, the push-based data, the pull-based data, and the queue-based data into integration data having an enhanced integration format, wherein the integrating includes:

map-reducing the push-based data, the pull-based data, and the queue-based data to a plurality of sub files associated with a plurality of subjects; and generating the integration data based at least in part on the plurality of sub files, the integration data being indicative of a plurality of data views corresponding to the plurality of subjects; and queuing the plurality of data views according to the pre-determined time interval in a database; and generating the GUI including at least a first data view of the plurality of data views, the GUI including one or more selectable icons, each icon of the one or more selectable icons representing a respective incentive, wherein the GUI is configured to initiate a first asynchronous call via an application programming interface (API) to populate a first dynamic field with a second data view of the queued plurality of data views, the first dynamic field including a first icon of the one or more selectable icons representing a first incentive receiving an update on the push-based data, the pull-based data, and the queue-based data associated with updated business plans of a plurality of business units, updated activities on the GUI, and updated user activities of users participating an incentive program;

updating the queued plurality of data views in the database; and receiving a first selection of the first incentive on the GUI causing the GUI to initiate a second asynchronous call via the API to populate the second dynamic field with a third data view of the queued plurality of data views, the third data view including information indicative of the updated business plan, the updated activities on the GUI, and the updated user activities of the users participating the incentive program, and the second dynamic field including a second icon of the one or more selectable icons representing a second incentive.

11. The big-data view integration method of claim 10, wherein the asynchronous call is an asynchronous JavaScript and extensible markup language (AJAX) based asynchronous call.

12. The big-data view integration method of claim 10, wherein the GUI is configured to generate a third dynamic field based on a second selection of the second incentive on the GUI, the second selection causing the GUI to populate the third dynamic field with a fourth data view of the queued plurality of data views, the fourth data view including information indicative of the updated activities on the GUI, and the updated user activities of the users participating the incentive program during the pre-determined time interval.

13. The big-data view integration method of claim 10, wherein the GUI is dynamically generated.

14. The big-data view integration method of claim 10, wherein the one or more selectable incentives icons are restricted to certain end users.

15. The big-data view integration method of claim 10, wherein the GUI includes a visual interpretation of the integration data comprising at least one of:
   comparisons of goals and actual results to the goals related to one or more users,
   accomplished activities of the one or more users, or
   business plans of a plurality of business units.

16. The big-data view integration method of claim 10, wherein the computing device is further caused to:
   receive the update on the push-based data, the pull-based data, and the queue-based data associated with updated business plans of a plurality of business units, updated activities on the GUI, and the updated user activities of users participating the incentive program in the pre-determined time interval;
   update the queued plurality of data views in the database in the pre-determined time interval; and
   update the GUI in the pre-determined time interval.

17. The big-data view integration method of claim 10, wherein the GUI is generated in real-time.

18. The big-data view integration method of claim 10, wherein the GUI is generated in near real-time.

19. The big-data view integration method of claim 17, wherein
   the push-based data and the pull-based data are received from a first platform service utilizing a first communication protocol, and
   the queue-based data is received from a first platform service and at least a second platform service utilizing a second communication protocol, the second communication protocol being different from the first communication protocol.

20. The big-data view integration method of claim 19, wherein the enhanced integration format is different from formats of the push-based data, the pull-based data, and the queue-based data.

* * * * *